United States Patent
Matsumoto et al.

(10) Patent No.: US 9,331,347 B2
(45) Date of Patent: May 3, 2016

(54) FUEL CELL SYSTEM AND CONTROL METHOD THEREOF

(75) Inventors: Yuji Matsumoto, Saitama (JP); Kenichiro Ueda, Saitama (JP); Chihiro Wake, Saitama (JP); Go Kikuchi, Saitama (JP); Koichiro Miyata, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1033 days.

(21) Appl. No.: 13/449,467

(22) Filed: Apr. 18, 2012

(65) Prior Publication Data

US 2012/0270126 A1 Oct. 25, 2012

(30) Foreign Application Priority Data

Apr. 20, 2011 (JP) ................................. 2011-094155
Apr. 21, 2011 (JP) ................................. 2011-094888

(51) Int. Cl.
*H01M 8/04* (2006.01)
*H01M 8/24* (2016.01)

(52) U.S. Cl.
CPC ........ *H01M 8/04* (2013.01); *H01M 8/24* (2013.01); *Y02E 60/50* (2013.01)

(58) Field of Classification Search
CPC ........................................................ H01M 8/04
See application file for complete search history.

(56) References Cited

U.S. PATENT DOCUMENTS

| 7,285,344 | B2 | 10/2007 | Imamura et al. |
|---|---|---|---|
| 2004/0033399 | A1 | 2/2004 | Imamura et al. |
| 2005/0118475 | A1* | 6/2005 | Ueda ............ H01M 8/04089 429/444 |
| 2007/0026273 | A1* | 2/2007 | Okamoto ........ H01M 8/04097 429/414 |
| 2007/0231637 | A1 | 10/2007 | Shibata et al. |
| 2008/0248341 | A1 | 10/2008 | Matsumoto et al. |
| 2010/0055521 | A1 | 3/2010 | Umayahara et al. |
| 2011/0027679 | A1 | 2/2011 | Nonobe |
| 2012/0021257 | A1 | 1/2012 | Yoshida et al. |

(Continued)

FOREIGN PATENT DOCUMENTS

| CN | 101542804 A | 9/2009 |
|---|---|---|
| CN | 100547841 C | 10/2009 |

(Continued)

OTHER PUBLICATIONS

JP Office Action for JP Application No. 2011-094155, dated Apr. 2, 2013.

(Continued)

*Primary Examiner* — Jacob Marks
(74) *Attorney, Agent, or Firm* — Squire Patton Boggs (US) LLP

(57) ABSTRACT

A fuel cell system that can quickly transition to idling stop and can suppress degradation of the electrolyte membrane and decline in cell voltage during idling stop, without requiring a discharge resistor to be provided, and a control method thereof are provided. A fuel cell system (1) includes a fuel cell (10) configured by layering a plurality of fuel cell cells that generate power by reactant gas being supplied thereto, and a supply device 20 that supplies reactant gas to the fuel cell (10), in which idling stop control is initiated to supply air of a lower flow rate than during idling power generation to the fuel cell (10), while producing lower current than during idling power generation from the fuel cell (10), in a case of a predetermined condition being established during idling power generation.

8 Claims, 10 Drawing Sheets

(56) References Cited

U.S. PATENT DOCUMENTS

| | | |
|---|---|---|
| 2012/0070756 A1 | 3/2012 | Yoshida |
| 2013/0095404 A1 | 4/2013 | Shibata et al. |

FOREIGN PATENT DOCUMENTS

| | | |
|---|---|---|
| DE | 112005001063 T5 | 3/2007 |
| DE | 112008000096 T5 | 11/2009 |
| DE | 112008003648 T5 | 12/2010 |
| DE | 112010001900 T5 | 6/2012 |
| DE | 112010001448 T5 | 8/2012 |
| DE | 112010002074 T5 | 1/2013 |
| EP | 2006946 B1 | 8/2010 |
| JP | 2004127915 A | 4/2004 |
| JP | 2005-327492 A | 11/2005 |
| JP | 2006-066115 A | 3/2006 |
| JP | 2006-294304 A | 10/2006 |
| JP | 2006280108 A | 10/2006 |
| JP | 2006302836 A | 11/2006 |
| JP | 2007141462 A | 6/2007 |
| JP | 2008257989 A | 10/2008 |
| WO | 2006117969 A1 | 11/2006 |
| WO | 2009115104 A1 | 6/2009 |
| WO | 2010112998 A1 | 10/2010 |
| WO | 2010113001 A1 | 10/2010 |
| WO | 2010136856 A1 | 12/2010 |

OTHER PUBLICATIONS

JP Office Action for JP Application No. 2011-094888, dated Apr. 2, 2013.

DE Search Report for DE Application No. 102012206370.6, dated Mar. 7, 2013.

Chinese Office Action application No. 201210113228.2 dated Jan. 28, 2014.

\* cited by examiner

FUEL CELL SYSTEM AND CONTROL METHOD THEREOF

This application is based on and claims the benefit of priority from Japanese Patent Application Nos. 2011-094155 and 2011-094888, respectively filed on 20 Apr. 2011 and 21 Apr. 2011, the contents of which are incorporated herein by reference.

BACKGROUND OF THE INVENTION

1. Field of the Invention

The present invention relates to a fuel cell system and a control method thereof. In more detail, the present invention relates to a fuel cell system that supplies a low flow rate of oxidizing gas and produces low current from the fuel cell during an idling stop, as well as a control method thereof.

2. Related Art

In recent years, fuel cell systems have received attention as a new source of power for automobiles. Fuel cell systems are provided with a fuel cell that generates power by allowing reactant gases to undergo an electrochemical reaction, and reactant gas supply devices that supplies reactant gases to the fuel cell via reactant gas channels, for example.

The fuel cell is a stack structure in which several tens to several hundreds of cells are stacked, for example. In this regard, each cell is configured by sandwiching a membrane electrolyte assembly (MEA) with a pair of separators. The membrane electrolyte assembly is configured by an anode and cathode, and a solid polymer electrolyte membrane sandwiched between these electrodes.

When hydrogen is supplied as fuel gas to the anode of the fuel cell, and air is supplied as oxidant gas to the cathode, an electrochemical reaction progresses to generate power. Fuel cells have been regarded as preferable in the aspect of high power generation efficiency since the fuel cell obtains electricity directly through an electrochemical reaction in this way. In addition, fuel cells have been regarded as preferable also in the aspect of the impact on the environment since only harmless water is produced during power generation.

However, in fuel cell vehicles with such a fuel cell system as the source of power, in a case of idling power generation being continuously carried out when the vehicle is stopped such as when waiting at a traffic signal, for example, idling stop to stop idling power generation is executed by stopping the supply of oxidant gas and fuel gas. Efficient use of fuel is made possible by executing this idling stop.

However, when executing this idling stop, the fuel cell becomes high potential due to the power generation from hydrogen and oxygen remaining inside the fuel cell system, and the electrolyte membrane may degrade. Therefore, a technology has been proposed for preventing the hydrogen and oxygen remaining inside the fuel cell system from being consumed by producing current from the fuel cell, and the fuel cell becoming high potential, along with suppressing degradation of the electrolyte membrane, even in a case of stopping the supplies of oxidant gas and fuel gas during idling stop (e.g., refer to Patent Document 1).

In addition, when executing idling stop, the hydrogen and oxygen staying in the vicinity of the electrolyte membrane during the occurrence of the cross-leakage phenomenon or the like will react at high concentrations, and the electrolyte membrane may degrade. Therefore, technology has been proposed to decrease the oxygen amount staying in the vicinity of the electrolyte membrane to suppress reaction with hydrogen by supplying oxidant gas of a low flow rate to the fuel cell during idling stop, thereby suppressing degradation of the electrolyte membrane (e.g., refer to Patent Document 2).

Patent Document 1: Japanese Unexamined Patent Application, Publication No. 2006-294304
Patent Document 2: Japanese Unexamined Patent Application, Publication No. 2005-327492

SUMMARY OF THE INVENTION

However, a diluter has been provided to fuel cell systems in order to prevent gas of a high fuel gas concentration from being discharged. The fuel off-gas discharged from the fuel cell is introduced into this diluter, and temporarily stays inside the diluter, and then is diluted and discharged. Oxidant off-gas discharged from the fuel cell is used to dilute the fuel off-gas.

However, since the oxidant gas is not supplied during idling stop with the technology of Patent Document 1, it is not possible to ensure oxidant off-gas for diluting the fuel off-gas staying inside the diluter. As a result, it has not been possible to transition to idling stop without first introducing oxidant gas as the dilution gas into the dilution chamber in advance in order to ensure dilution gas for diluting the fuel off-gas.

In addition, since oxidant gas is not supplied during idling stop with the technology of Patent Document 1, the hydrogen and oxygen staying in the vicinity of the electrolyte membrane during the occurrence of the cross-leakage phenomenon or the like will react at high concentrations, and the electrolyte membrane has been at risk of degrading.

Furthermore, since current is produced from the fuel cell in a state with the supplies of fuel gas and oxidant gas stopped during idling stop, the cell voltage will decline immediately after transitioning to idling stop, and it has been necessary to immediately cancel the idling stop.

Moreover, since oxidant gas is not supplied during idling stop, the air pump is not driven during idling stop. As a result, irrespective of whether or not being in a state capable of recharging the electricity storage device, in order to produce current from the fuel cell during idling stop, there has been a necessity to provide a discharge resistor for consuming this current.

The present invention has been made taking the above matters into account, and an object thereof is to provide a fuel cell system that can quickly transition to idling stop and can suppress degradation of the electrolyte membrane and a decline in cell voltage during idling stop, without requiring a discharge resistor to be provided, and a control method thereof.

In addition, if the production of current from the fuel cell is completely stopped as in the above-mentioned technology of Patent Document 2, the fuel cell will become high potential due to the power generation of hydrogen and oxygen remaining in the fuel cell system, and the electrolyte membrane may degrade. As a result, it is regarded as preferable to produce low current from the fuel cell also during idling stop. Therefore, by executing idling stop control to supply oxidant gas of a low flow rate to the fuel cell during idling stop to produce low current from the fuel cell, it is possible to suppress both degradation of the electrolyte membrane from the reaction between hydrogen and oxygen staying in the vicinity of the electrolyte membrane, and degradation of the electrolyte membrane due to a change to high potential of the fuel cell.

However, in a case of the fuel cell system during execution of the above-mentioned idling stop control being in an environment with low atmospheric pressure such as high ground, i.e. in an environment in which the density of air is low, in order to ensure the same amount of flow rate of air supplied as the oxidant gas as at sea level, the air pump serving as the oxidant gas supply means is operated at a high revolution speed. When this is done, there has been a problem in that the revolution speed of the air pump will exceeds an upper limit guaranteeing favorable noise and vibration (hereinafter referred to as "NV (Noise Vibration)") performance of the fuel cell system during idling stop, and NV performance deteriorates.

The present invention was made taking the above into account, and an object thereof is to provide a fuel cell system that can suppress deterioration of NV performance even in a case of the fuel cell system being in a low-pressure environment during execution of idling stop control to supply oxidant gas of a low flow rate and produce a low current from the fuel cell, and a control method thereof.

In order to achieve the above-mentioned object, in a fuel cell system according to the present invention (e.g., the fuel cell system 1 described later) that has a fuel cell stack (e.g., the fuel cell 10 described later) having stacked together a plurality of fuel cells that generate power by being supplied reactant gas (e.g., the hydrogen and air described later), and a reactant gas supply means (e.g., the air pump 21, hydrogen tank 22, ejector 28 and regulator 261 described later) for supplying reactant gas to the fuel cell stack, the system includes: an idling stop control means (e.g., the idling stop control part of the ECU 40 and the VCU 15 described later) for initiating idling stop control to, in a case of a predetermined condition being established during idling power generation, supply oxidant gas (e.g., the air described later) of a lower flow rate than during the idling power generation to the fuel cell stack by way of the reactant gas supply means, while producing a lower current than during idling power generation from the fuel cell stack.

First, according to the present invention, since current is produced from the fuel cell stack during idling stop, it is possible to avoid an OCV state in which the output current value is 0, and degradation of the electrolyte membrane due to a change to high potential of the fuel cell stack can be suppressed.

In addition, according to the present invention, the current produced from the fuel cell stack during idling stop is lower current than during idling power generation; therefore, it is possible to suppress a decline in the cell voltage during idling stop.

Furthermore, according to the present embodiment, oxidant gas is supplied to the fuel cell stack during idling stop; therefore, oxidant off-gas for diluting the fuel off-gas staying in the diluter (e.g., the diluter 50 described later) can be ensured. As a result, the dilution gas (oxidant gas, e.g. the air described later) amount that must be ensured in advance can be decreased, and it is possible to quickly transition to idling stop. The fuel consumption can also be improved thereby.

In addition, according to the present invention, since oxidant gas is supplied during idling stop, the oxygen amount staying in the vicinity of the electrolyte membrane during the occurrence of the cross-leakage phenomenon or the like can be decreased; therefore, hydrogen and oxygen can be suppressed from reacting at high concentrations in the vicinity of the electrolyte membrane, and thus degradation of the electrolyte membrane can be suppressed.

Furthermore, according to the present invention, since oxidant gas is supplied during idling stop, the current produced from the fuel cell stack can be consumed by the driving of an air pump (e.g., the air pump 21 described later). The current produced by the fuel cell stack can thereby be consumed irrespective of whether or not in a state capable of recharging the electricity storage device (e.g., the high-voltage battery 16 described later); therefore, there is no necessity to provide a discharge resistor.

Moreover, according to the present invention, the oxidant gas flow rate supplying the fuel cell stack during idling stop is a lower flow rate than during idling power generation; therefore, it is possible to decrease the supply of unneeded oxidant gas and deterioration in the efficiency of the fuel cell system can be suppressed, while obtaining the aforementioned effects.

In this case, it is preferable to further include: a cell voltage threshold determination means (e.g., the cell voltage threshold determination part of the ECU 40, cell voltage sensor 41 and means relating to execution of Step S1 in FIG. 2 described later) for determining whether a lowest cell voltage of the fuel cell stack falls below a predetermined lowest cell voltage threshold during the idling stop control; and a cell voltage recovery means (e.g., the cell voltage recovery part of the ECU 40 and means relating to execution of Steps S4 and S5 in FIG. 2 described later) for recovering cell voltage of the fuel cell stack by increasing a flow rate of oxidant gas supplying the fuel cell stack by way of the reactant gas supply means, in a case of having determined that the lowest cell voltage falls below the lowest cell voltage threshold.

Usually, the water produced during power generation will be discharged to outside the system by the reactant gas supplied. However, in a case of the flow rate of oxidant gas being low as during idling stop of the present invention, for example, the water in a gas channel will not be completely discharged, and the flooding phenomenon will occur, blocking the gas channel. When the flooding phenomenon occurs, the oxidant gas becomes unable to circulate; therefore, the hydrogen and oxygen will react at high concentrations in the vicinity of the electrolyte membrane, and it will no longer be able to suppress degradation of the electrolyte membrane.

In addition, when the flooding phenomenon occurs, the lowest cell voltage of the fuel cell stack greatly declines. In this case, the cell voltage becomes unstable immediately after returning from idling stop, and current limitation may become necessary.

Therefore, according to the present invention, in a case of the lowest cell voltage of the fuel cell stack falling below the predetermined lowest cell voltage threshold during idling stop, it is determined that it is necessary to resolve the flooding phenomenon, and the flow rate of oxidant gas supplying the fuel cell stack is increased. Since the flooding phenomenon is thereby resolved, it is possible to suppress degradation of the electrolyte membrane as well as being able to recover the cell voltage, and a stable cell voltage can be ensured immediately after returning from idling stop.

In this case, it is preferable to further include: a cell voltage decline time determination means (e.g., the cell voltage decline time determination part of the ECU 40 and means relating to execution of Step S3 in FIG. 2 described later) for determining whether a cell voltage decline time, which is a time from initiating the idling stop control until the lowest cell voltage of the fuel cell stack falls below the lowest cell voltage threshold, is within a predetermined time, in which the cell voltage recovery means causes the cell voltage of the fuel cell stack to recover by increasing a flow rate of oxidant gas supplying the fuel cell stack to more than during the idling power generation by way of the reactant gas supply means, in a case of having determined that the cell voltage decline time is within the predetermined time.

In a case of the lowest cell voltage falling below the predetermined lowest cell voltage threshold within a predetermined time after initiating idling stop control, this abnormal decline in cell voltage is considered to be caused by the flooding phenomenon occurring excessively and a large amount of water blocking the insides of the gas channel. As a result, even if trying to increase the flow rate of oxidant gas supplying the fuel cell stack, in the case of the flow rate thereof being low, it may not be possible to adequately resolve the flooding phenomenon.

Therefore, according to the present invention, in a case of the cell voltage decline time being within a predetermined time, the flow rate of oxidant gas is increased to more than during idling power generation. Since the flooding phenomenon is thereby reliably resolved, it is possible to suppress degradation of the electrolyte membrane as well as being able to recover the cell voltage, and a stable cell voltage can be ensured immediately after returning from idling stop.

In this case, it is preferable for the cell voltage recovery means to cause the cell voltage of the fuel cell stack to recover by increasing a flow rate of oxidant gas supplying the fuel cell stack by way of the reactant gas supply means more, as the cell voltage decline time shortens.

According to the present invention, the flow rate of oxidant gas increases as the cell voltage suddenly declines and the cell voltage decline time shortens. In other words, the oxidant gas flow rate supplying the fuel cell stack increases depending on the extent of occurrence of the flooding phenomenon. Since the flooding phenomenon is thereby more reliably resolved, it is possible to suppress degradation of the electrolyte membrane as well as being able to recover the cell voltage, and thus a stable cell voltage can be ensured immediately after returning from idling stop.

In addition, it is preferable for the reactant gas supply means that includes an oxidant gas supply means (e.g., the air pump 21 described later) for supplying oxidant gas to the fuel cell stack, to the fuel cell system (e.g., the fuel cell system 1A described later) further includes: a low-pressure environment determination means (e.g., the low-pressure environment determination part of the ECU 40A, atmospheric pressure sensor 42 and GPS sensor 43 described later) for determining whether the fuel cell system is in a low-pressure environment during the idling stop control; and an operation limiting means (e.g., the operation limitation part of the ECU 40A described later) for limiting operation of the oxidant gas supply means in a case of having determined that the fuel cell system is in a low-pressure environment.

According to the present invention, in a fuel cell system that executes idling stop control to supply oxidant gas of a lower flow rate than during idling power generation to the fuel cell during idling stop, while producing a lower current than during idling power generation from the fuel cell, the operation of the oxidant gas supply means is limited in a case of the fuel cell system being in a low-pressure environment. More specifically, in a case of using an air pump as the oxidant gas supply means, for example, the upper limit for the revolution speed of the air pump is set to allow the air pump to operate at no more than this upper limit. Even in a case of the fuel cell system being in a low-pressure environment such as high ground during execution of the above-mentioned idling stop control, it is possible to limit the operation of the air pump, and thus deterioration of the NV performance can be suppressed.

In this case, it is preferable for the oxidant gas supply means to be an air pump (e.g., the air pump 21 described later).

The above-mentioned effects of the invention are reliably exerted according to the present invention. In addition, deterioration of the NV performance can be suppressed by way of simple control, since simply controlling the revolution speed of the air pump is sufficient.

In this case, it is preferable to further include: a cell voltage threshold determination means (e.g., the cell voltage threshold determination part of the ECU 40A, cell voltage sensor 41 and means relating to execution of Step S31 in FIG. 8 described later) for determining whether a lowest cell voltage of the fuel cell stack falls below a predetermined lowest cell voltage threshold during the limiting operation of the oxidant gas supply means by the operation limiting means; and a cell voltage recovery means (e.g., the cell voltage recovery part of the ECU 40A and means relating to execution of Steps S34 and S35 in FIG. 8 described later) for recovering cell voltage of the fuel cell stack by increasing a flow rate of oxidant gas supplying the fuel cell stack by way of the oxidant gas supply means, in a case of having determined that the lowest cell voltage falls below the lowest cell voltage threshold.

According to the present invention, in a case of the lowest cell voltage of the fuel cell stack falling below the predetermined lowest cell voltage threshold during the limiting operation of the oxidant gas supply means by the operation limiting means, it is determined that it is necessary to resolve the flooding phenomenon, and the flow rate of oxidant gas supplying the fuel cell stack is increased. Since the flooding phenomenon is thereby resolved, it is possible to suppress degradation of the electrolyte membrane as well as being able to recover the cell voltage, and a stable cell voltage can be ensured immediately after returning from idling stop.

In this case, it is preferable to further include: a cell voltage decline time determination means (e.g., the cell voltage decline time determination part of the ECU 40A and means relating to execution of Step S33 in FIG. 8 described later) for determining whether a cell voltage decline time, which is a time from initiating the limiting operation of the oxidant gas supply means by the operation limiting means until the lowest cell voltage of the fuel cell stack falls below the lowest cell voltage threshold, is within a predetermined time, in which the cell voltage recovery means causes the cell voltage of the fuel cell stack to recover by increasing a flow rate of oxidant gas supplying the fuel cell stack to more than during the idling power generation by way of the oxidant gas supply means, in a case of having determined that the cell voltage decline time is within the predetermined time.

According to the present invention, in a case of the cell voltage decline time being within a predetermined time, the flow rate of oxidant gas is increased to more than during idling power generation. Since the flooding phenomenon is thereby reliably resolved, it is possible to suppress degradation of the electrolyte membrane as well as being able to recover the cell voltage, and a stable cell voltage can be ensured immediately after returning from idling stop.

In this case, it is preferable for the cell voltage recovery means to cause the cell voltage of the fuel cell stack to recover by increasing a flow rate of oxidant gas supplying the fuel cell stack by way of the oxidant gas supply means more, as the cell voltage decline time shortens.

According to the present invention, the flow rate of oxidant gas increases as the cell voltage suddenly declines and the cell voltage decline time shortens. In other words, the oxidant gas flow rate supplying the fuel cell stack increases depending on the extent of occurrence of the flooding phenomenon. Since the flooding phenomenon is thereby more reliably resolved, it is possible to suppress degradation of the electrolyte membrane as well as being able to recover the cell voltage, and thus a stable cell voltage can be ensured immediately after returning from idling stop.

In addition, in a method for controlling a fuel cell system (e.g., the fuel cell system 1 described later) of the present invention that has a fuel cell stack (e.g., the fuel cell 10 described later) having stacked together a plurality of fuel cells that generate power by being supplied reactant gas (e.g., the hydrogen and air described later), and a reactant gas supply means (e.g., the air pump 21, hydrogen tank 22, ejector 28 and regulator 261 described later) for supplying reactant gas to the fuel cell stack, the method includes: an idling stop step (e.g., idling stop control step executed by the idling stop control part of the ECU 40 described later), initiated in a case of a predetermined condition being established during idling power generation, for supplying oxidant gas (e.g., the air described later) of a lower flow rate than during the idling power generation to the fuel cell stack by way of the reactant gas supply means, while producing a lower current than during the idling power generation from the fuel cell stack.

In this case, it is preferable to further include: a cell voltage threshold determination step (e.g., the step illustrated as Step S1 in FIG. 2 described later) of determining whether a lowest cell voltage of the fuel cell stack falls below a predetermined lowest cell voltage threshold during the idling stop step; and a cell voltage recovery step (e.g., the step illustrated as Steps S4 and S5 in FIG. 2 described later) of recovering the cell voltage of the fuel cell stack by increasing a flow rate of oxidant gas supplying the fuel cell stack by way of the reactant gas supply means, in a case of having determined that the lowest cell voltage falls below the lowest cell voltage threshold.

In this case, it is preferable to further include a cell voltage decline time determination step (e.g., the step illustrated as Step S3 in FIG. 2 described later) of determining whether a cell voltage decline time, which is a time from initiating the idling stop step until the lowest cell voltage of the fuel cell stack falls below the lowest cell voltage threshold, is within a predetermined time, in which, in the cell voltage recovery step, the cell voltage of the fuel cell stack is made to recover by increasing the flow rate of oxidant gas supplying the fuel cell stack by way of the reactant gas supply means to more than during the idling power generation, in a case of having determined that the cell voltage decline time is within the predetermined time.

In this case, it is preferable in the cell voltage recovery step for the cell voltage to be made to recover by increasing the flow rate of oxidant gas supplying the fuel cell stack by way of the reactant gas supply means more, as the cell voltage decline time shortens.

In addition, it is preferable to further include: a low-pressure environment determination step (e.g., the step illustrated as Step S12 in FIG. 6 described later) for determining whether the fuel cell system (e.g., the fuel cell system 1A described later) is in a low-pressure environment during the idling stop step; and an operation limiting step (e.g., the step illustrated as Step S14 in FIG. 6 described later) for limiting operation of the oxidant gas supply means included in the reactant gas supply means in a case of having determined that the fuel cell system is in a low-pressure environment.

In this case, it is preferable to further include: a cell voltage threshold determination step (e.g., the step illustrated as Step S31 in FIG. 8 described later) of determining whether a lowest cell voltage of the fuel cell stack falls below a predetermined lowest cell voltage threshold during the operation limiting step; and a cell voltage recovery step (e.g., the step illustrated as Steps S34 and S35 in FIG. 8 described later) of recovering the cell voltage of the fuel cell stack by increasing a flow rate of oxidant gas supplying the fuel cell stack by way of the oxidant gas supply means, in a case of having determined that the lowest cell voltage falls below the lowest cell voltage threshold.

In this case, it is preferable to further include a cell voltage decline time determination step (e.g., the step illustrated as Step S33 in FIG. 8 described later) of determining whether a cell voltage decline time, which is a time from initiating the operation limiting step until the lowest cell voltage of the fuel cell stack falls below the lowest cell voltage threshold, is within a predetermined time, in which, in the cell voltage recovery step, the cell voltage of the fuel cell stack is made to recover by increasing the flow rate of oxidant gas supplying the fuel cell stack by way of the oxidant gas supply means to more than during the idling power generation, in a case of having determined that the cell voltage decline time is within the predetermined time.

In this case, it is preferable in the cell voltage recovery step for the cell voltage to be made to recover by increasing the flow rate of oxidant gas supplying the fuel cell stack by way of the oxidant gas supply means more, as the cell voltage decline time shortens.

These methods of controlling a fuel cell system each develop the afore-mentioned fuel cell system as an invention of a method, and thus exert similar effects as the aforementioned fuel cell system.

According to the present invention, it is possible to provide a fuel cell system that can quickly transition to idling stop and can suppress degradation of the electrolyte membrane and decline in cell voltage during idling stop, without requiring a discharge resistor to be provided, and a control method thereof.

In addition, according to the present invention, it is possible to provide a fuel cell system that can suppress deterioration of NV performance even in a case of the fuel cell system being in a low pressure environment during execution of idling stop control to supply oxidant gas of low flow rate and produce low current from the fuel cell, and a control method thereof.

DETAILED DESCRIPTION OF THE INVENTION

Hereinafter, a first embodiment of the present invention will be explained while referencing the drawings. It should be noted that, in the explanation of a second embodiment, the same symbols are assigned for configurations shared with the first embodiment, and explanations thereof will be omitted or simplified.

First Embodiment

Figure 1:
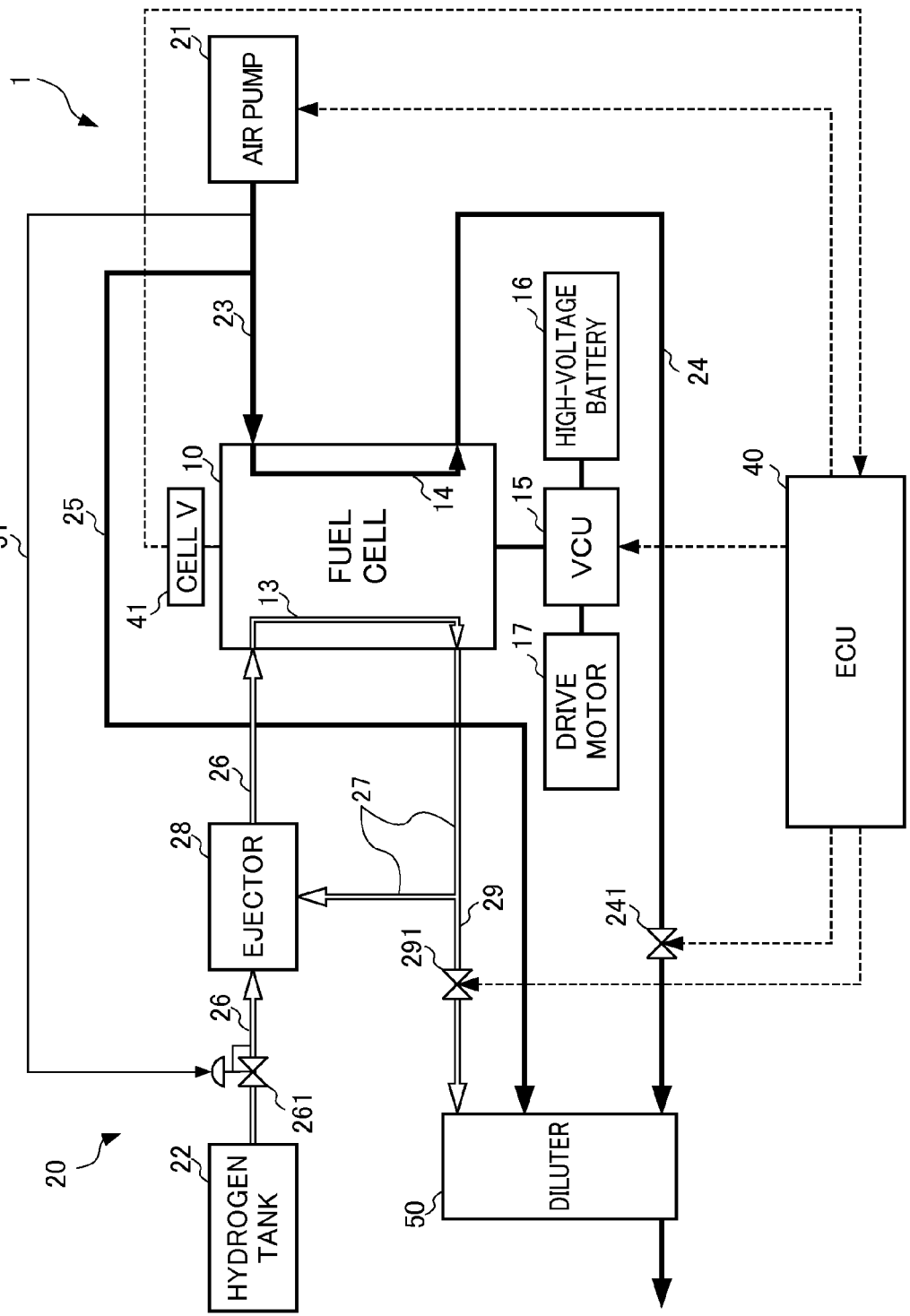
FIG. 1 is a block diagram showing a fuel cell system according to a first embodiment of the present invention.

FIG. 1 is a block diagram of a fuel cell system 1 according to the first embodiment.

The fuel cell system 1 includes a fuel cell 10 as a fuel cell stack, a supply device 20 as a reactant gas supply means for supplying reactant gas to this fuel cell 10, and an electronic control unit (hereinafter referred to as "ECU") 40 that controls this fuel cell 10 and this supply device 20. This fuel cell system 1 is equipped to a fuel cell vehicle not illustrated that has electric power generated by the fuel cell 10 as the source of power, for example.

The fuel cell 10 is a stack structure in which from several tens to several hundreds of fuel cell cells are electrically connected in series to be layered. Each cell is configured by sandwiching a membrane electrode assembly (MEA) with a pair of separators. The membrane electrode assembly is configured by the two electrodes of an anode and a cathode, and a solid polymer electrolyte membrane sandwiched by these electrodes. Usually, both electrodes are formed from a catalyst layer contacting the solid polymer electrolyte membrane and carrying out oxidation and reduction reactions, and a gas diffusion layer contacting this catalyst layer.

Such a fuel cell 10 generates power by the electrochemical reaction between hydrogen and oxygen progressing when hydrogen is supplied as the fuel gas to an anode channel 13 formed on an anode side thereof, and air is supplied as an oxidant gas containing oxygen to a cathode channel 14 formed on a cathode side thereof.

In addition, the fuel cell 10 is connected to a high-voltage battery 16 as an electricity storage device and a drive motor 17 serving as an electrical load via a current limiter (VCU) 15. Electrical power generated in the fuel cell 10 is supplied to the high-voltage battery 16 and drive motor 17.

The VCU 15 includes a DC/DC converter not illustrated, and controls the discharge current of the fuel cell 10 based on a current command value output from the ECU 40.

The high-voltage battery 16 stores the electrical power generated by the fuel cell 10, in a case of the voltage of the high-voltage battery 16 being lower than the output voltage of the fuel cell 10. On the other hand, electrical power is supplied to the drive motor 17 as necessary to supplement driving of the drive motor 17. This high-voltage battery 16 is configured, for example, by a rechargeable battery such as a lithium-ion battery, or capacitors, or the like.

The supply device 20 is configured to include an air pump 21 as an oxidant gas supply means for supplying air to the cathode channel 14, a hydrogen tank 22 as a fuel gas supply means for supplying hydrogen to the anode channel 13, an ejector 28, and a regulator 261.

The air pump 21 is connected to an end side of the cathode channel 14 via an air supply line 23. An air discharge line 24 is connected to the other end side of the cathode channel 14, and a diluter 50 described later is connected to a leading end side of this air discharge line 24. The air discharge line 24 introduces air (oxidant off-gas) discharged from the fuel cell 10 into the diluter 50.

In addition, a back-pressure valve 241 is provided in the air discharge line 24. This back-pressure valve 241 controls the pressure inside the air supply line 23 and cathode channel 14 to a predetermined pressure.

In addition, a dilution gas channel 25 that introduces air compressed by the air pump 21 as dilution gas to the diluter 50 is provided to branch from the air supply line 23. A leading end side of the dilution gas channel 25 is connected to the diluter 50. A dilution gas shutoff valve not illustrated that opens and closes the dilution gas channel 25 is provided to the dilution gas channel 25.

The hydrogen tank 22 is connected to an end side of the anode channel 13 via a hydrogen supply line 26. The ejector 28 is provided to this hydrogen supply line 26. In addition, a hydrogen shutoff valve not illustrated that opens and closes the hydrogen supply line 26, and a regulator 261 that controls the flow rate of hydrogen supplied from the hydrogen tank 22 are provided in the hydrogen supply line 26 between the hydrogen tank 22 and the ejector 28.

The pressure of the air from the air pump 21 heading to the hydrogen supply line 26 is input as a signal pressure (pilot pressure) to the regulator 261 via a pipe 31 in which an orifice not illustrated is provided. The regulator 261 controls the pressure of hydrogen based on the pressure of the air input thereto, and the flow rate of hydrogen to be supplied is thereby controlled.

A hydrogen recirculation line 27 is connected to the other end side of the anode channel 13. The leading end side of this hydrogen recirculation line 27 is connected to the ejector 28. The hydrogen recirculation line 27 introduces hydrogen (fuel off-gas) discharged from the fuel cell 10 to the ejector 28. The ejector 28 collects hydrogen passing through the hydrogen recirculation line 27 to recirculate to the hydrogen supply line 26.

A hydrogen discharge line 29 branching from the hydrogen recirculation line 27 for discharging hydrogen (fuel off-gas) is provided to the hydrogen recirculation line 27. The diluter 50 is connected to the leading end side of the hydrogen discharge line 29.

A purge valve 291 that opens and closes the hydrogen discharge line 29 is provided to the hydrogen discharge line 29. By purge processing being executed by opening this purge valve 291, hydrogen (fuel off-gas) discharged from the fuel cell 10 is introduced to the diluter 50.

The diluter 50 dilutes fuel off-gas introduced via the hydrogen discharge line 29 and staying inside the diluter 50, with oxidant off-gas introduced via the air discharge line 24 and oxidant gas introduced via the dilution gas channel 25. The fuel off-gas is introduced into the diluter 50 and diluted inside of the diluter 50 by the purge valve 291 opening and purge processing being executed, and then is released to the atmosphere.

In the present embodiment, the cathode channel 14, air supply line 23, air discharge line 24 and dilution gas channel 25 constitute an oxidant gas channel system through which the oxidant gas or oxidant off-gas flow, and are illustrated by black arrows in FIG. 1. In addition, the anode channel 13, hydrogen supply line 26, hydrogen recirculation line 27 and hydrogen discharge line 29 constitute a fuel gas channel system through which fuel gas or fuel off-gas flow, and are illustrated by white arrows in FIG. 1.

The aforementioned air pump 21, back-pressure valve 241, dilution gas shutoff valve, hydrogen shutoff valve and purge valve 291 are electrically connected to the ECU 40, and are controlled by the ECU 40.

The ECU 40 is provided with an input circuit having functions such as shaping signal waveforms that are input from various kinds of sensors, correcting voltage levels to a predetermined level, and converting analog signal values into digital signal values, and a central processing unit (hereinafter referred to as "CPU"). Furthermore, the ECU 40 is provided with a memory circuit that stores various kinds of calculation programs to be executed by the CPU, calculation results, and the like, and an output circuit that outputs control signals to the air pump 21, back-pressure valve 241, dilution gas shutoff valve, hydrogen shutoff valve, purge valve 291, etc.

In addition, a cell voltage sensor 41 that detects the cell voltage of the fuel cell 10 is connected to the ECU 40. This cell voltage sensor 41 detects the cell voltage of each of the plurality of fuel cell cells constituting the fuel cell 10. The detection signal is transmitted to the ECU 40, and among the cell voltages of each of the fuel cell cells detected, the cell voltage that is the lowest is defined as the lowest cell voltage.

It should be noted that the cell voltage sensor 41 may be configured to define at least two among the plurality of fuel cell cells as one fuel cell group, and detect the voltage of each of these fuel cell groups. In this case, among the voltages of each of the fuel cell groups, the voltage that is the lowest is defined as the lowest cell voltage.

The ECU 40 is provided with an idling stop control part, cell voltage threshold determination part, cell voltage decline time determination part, and cell voltage recovery part as modules for executing idling stop control and cell voltage recovery control described later.

The idling stop control part initiates the idling stop control described later, in a case of a predetermined condition being established during idling power generation.

Herein, idling power generation performing power generation at lower stoichiometry compared to during normal power generation when the vehicle is traveling is executed in a case of the vehicle speed continually being zero for a predetermined time, for example.

In addition, the case of a predetermined condition being established is a case of the hydrogen concentration presently in the diluter 50 being no more than a predetermined hydrogen concentration, and it being determined that dilution of the fuel off-gas inside the diluter 50 has completed. The predetermined hydrogen concentration is set to a concentration at which hydrogen of a high concentration is not discharged to outside the vehicle in a case of executing the idling stop control described later.

The hydrogen concentration presently in the diluter 50 is calculated based on the integrated value of the dilution gas amount introduced into the dilutor 50 since the purge valve 291 was opened and fuel off-gas was introduced into the diluter 50, i.e. since the previous purge processing. In other words, in a case of the integrated value of the dilution gas amount introduced into the diluter 50 after the previous purge processing is at least a predetermined value, the hydrogen concentration presently in the diluter 50 can be determined to be no more than a predetermined hydrogen concentration. The integrated value of the dilution gas since the previous purge processing is calculated based on the electrical current integrated value since the previous purge processing.

It should be noted that whether or not dilution has completed may be determined based on the detection signal of a hydrogen concentration sensor detecting the hydrogen concentration in gas discharged from the diluter 50, for example.

In response to the above-mentioned predetermined condition having been established, the idling stop control part initiates idling stop control to produce a lower current than during idling power generation from the fuel cell 10, while supplying air of a lower flow rate than during idling power generation to the fuel cell 10.

More specifically, the idling stop control part outputs an electrical current command value (hereinafter referred to as "idling stop current command value") lower than an electrical current command value during idling power generation (hereinafter referred to as "idling power generation current command value") to the VCU 15, and controls the discharge current of the fuel cell 10. The discharge current thereby decreases more than during idling power generation. This discharge current is used in driving of the air pump 21.

It should be noted that this idling stop control is cancelled in a case of the lowest cell voltage of the fuel cell 10 falling below a lowest cell voltage threshold described later, and the cell voltage recovery control described later being executed, or in a case of there being an acceleration request from the driver.

In addition, the idling stop control part sets the air flow rate of a lower flow rate than during idling power generation in accordance with the idling stop current command value, and outputs a command value for the air pump revolution speed to the air pump 21 in accordance with the air flow rate thus set. Air of a lower flow rate than during idling power generation is thereby supplied to the fuel cell 10. In addition, in the fuel cell system 1 of the present embodiment, a signal pressure corresponding to air of a low flow rate is input to the regulator 261, whereby hydrogen of a lower flow rate than during idling power generation is supplied to the fuel cell 10. In other words, power generation is performed at an even lower stoichiometry than during idling power generation. For example, although the stoichiometric ratio in idling power generation is set to about 2.0, the stoichiometric ratio in idling stop control of the present embodiment is set to about 1.0.

The cell voltage threshold determination part determines whether or not the lowest cell voltage of the fuel cell 10 falls below the predetermined lowest cell voltage threshold during the above-mentioned idling stop control.

In more detail, the cell voltage threshold determination part acquires the lowest cell voltage that is the lowest among the cell voltages of each of the fuel cell cells detected by the cell voltage sensor 41, and determines whether or not the lowest cell voltage thus acquired falls below the predetermined lowest cell voltage threshold.

Herein, the predetermined lowest cell voltage threshold is no more than the cell voltage initiating current limitation from the viewpoint of protection of the fuel cell 10 during normal power generation when the vehicle is traveling, and is set to a value that does not bring about a negative voltage. Allowing the discharge current command value to increase is thereby avoided irrespective of there necessity of initiate current limitation, whereby stable cell voltage is ensured.

The cell voltage decline time determination part determines whether or not the time period from initiating the above-mentioned idling stop control until the lowest cell voltage of the fuel cell 10 falls below the above-mentioned lowest cell voltage threshold (hereinafter referred to as "cell voltage decline time") is within a predetermined time (hereinafter referred to as "cell voltage abnormal decline determination time").

In more detail, the cell voltage decline time determination part acquires the above-mentioned cell voltage decline time by measuring with a timer, and determines whether or not the cell voltage decline time thus acquired is within the above-mentioned cell voltage abnormal decline determination time. Herein, the cell voltage abnormal decline determination time is set by performing experiments in advance.

The cell voltage recovery control part executes cell voltage recovery control to recover the cell voltage during the above-mentioned idling stop control.

More specifically, the cell voltage recovery control part increases the flow rate of air supplying the fuel cell 10 in a case of having determined that the lowest cell voltage of the fuel cell 10 falls below the lowest cell voltage threshold, by way of the above-mentioned cell voltage threshold determination part.

In addition, the air flow rate is increased to more than during idling power generation in a case of having determined that the cell voltage decline time is within the cell voltage abnormal decline determination time, by way of the above-mentioned cell voltage decline time determination part. More specifically, the discharge current becomes greater than during idling power generation by outputting a current command value (hereinafter referred to as "abnormal cell voltage recovery current command value") higher than the idling power generation current command value to the VCU 15. In addition, depending on the abnormal cell voltage recovery current command value, an air flow rate of a higher flow rate than during idling power generation is set, and a command value of the air pump revolution speed corresponding to the air flow rate thus set is output to the air pump 21. Air of a higher flow rate than during idling power generation is thereby supplied to the fuel cell 10. In addition, signal pressure corresponding to the air of high flow rate is input to the regulator 261, and hydrogen of a higher flow rate than during idling power generation is supplied to the fuel cell 10. In other words, power generation is performed at a higher stoichiometry than during idling power generation.

In addition, the cell voltage recovery control part increases the air flow rate with a shorter cell voltage decline time, in a case of having determined that the cell voltage decline time is within the cell voltage abnormal decline determination time. In other words, a current command value in accordance with the cell voltage decline time is output to the VCU 15, and a command value of the air pump revolution speed in accordance with this current command value is output to the air pump 21. The air flow rate and hydrogen flow rate are thereby increased in accordance with the cell voltage decline time, i.e. extent of occurrence of the flooding phenomenon.

Hereinafter, the cell voltage recovery control to recover the cell voltage during idling stop control by the ECU will be explained in detail while referencing FIG. 2.

Figure 2:
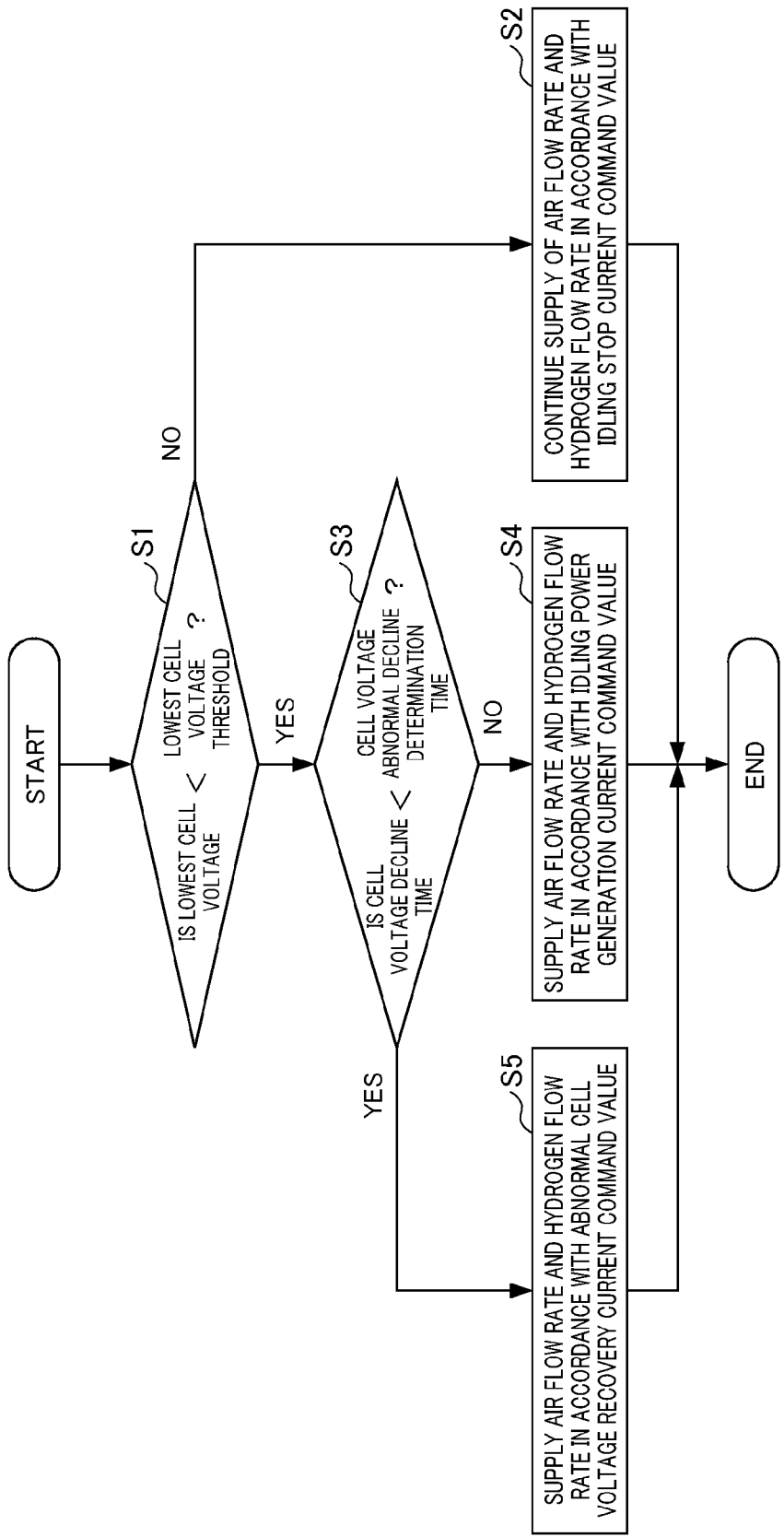
FIG. 2 is a flowchart showing a sequence of cell voltage recovery control processing to recover cell voltage during idling stop control according to the first embodiment.

FIG. 2 is a flowchart showing a sequence of cell voltage recovery control processing to recover the cell voltage during idling stop control by the ECU. The processing shown in FIG. 2 is repeatedly executed every predetermined control cycle by the ECU during idling stop control.

In Step S1, it is determined whether the lowest cell voltage of the fuel cell falls below the predetermined lowest cell voltage threshold during idling stop control. In the case of this determination being YES, it is determined that the flooding phenomenon occurs, and it is necessary to recover the cell voltage by resolving the flooding phenomenon, and then the processing advances to Step S3. In the case of this determination being NO, it is determined that it is not yet necessary to recover the cell voltage, and then the processing advances to Step S2.

In Step S2, the idling stop current command value is output to the VCU, and the supply of air and hydrogen of low flow rates in accordance with the idling stop current command value is continued. In other words, the idling stop control is continued, and the present processing is terminated.

In Step S3, it is determined whether the cell voltage decline time is within a predetermined cell voltage abnormal decline determination time. In the case of this determination being YES, an abnormal decline of the cell voltage is recognized due to the occurrence of the flooding phenomenon, and it is determined that the flooding phenomenon cannot be resolved if the air flow rate is not increased to more than during idling power generation, and then the processing advances to Step S5. In the case of this determination being NO, a normal decline of the cell voltage is recognized, and it is determined that the flooding phenomenon can be resolved if increased to an air flow rate of the same amount as during idling power generation, and then the processing advances to Step S4.

In Step S4, the idling power generation current command value is output to the VCU, and air and hydrogen of flow rates according to the idling power generation current command value, which are higher than the flow rates according to the idling stop current command value, are supplied. The air and hydrogen of higher flow rates come to be supplied, a result of which the flooding phenomenon is resolved, and the degradation of the electrolyte membrane is suppressed, while the cell voltage recovers. The idling stop control is thereby cancelled, and the present processing is terminated.

In Step S5, the abnormal cell voltage recovery current command value is output to the VCU, and air and hydrogen of flow rates according to the abnormal cell voltage recovery current command value, which are even higher than the flow rates according to the idling power generation current command value, are supplied. Air and hydrogen of even higher flow rates come to be supplied, a result of which the flooding phenomenon is more reliably resolved, and degradation of the electrolyte membrane is suppressed, while the cell voltage recovers. The idling stop control is thereby cancelled, and the present processing is terminated.

Figure 3:
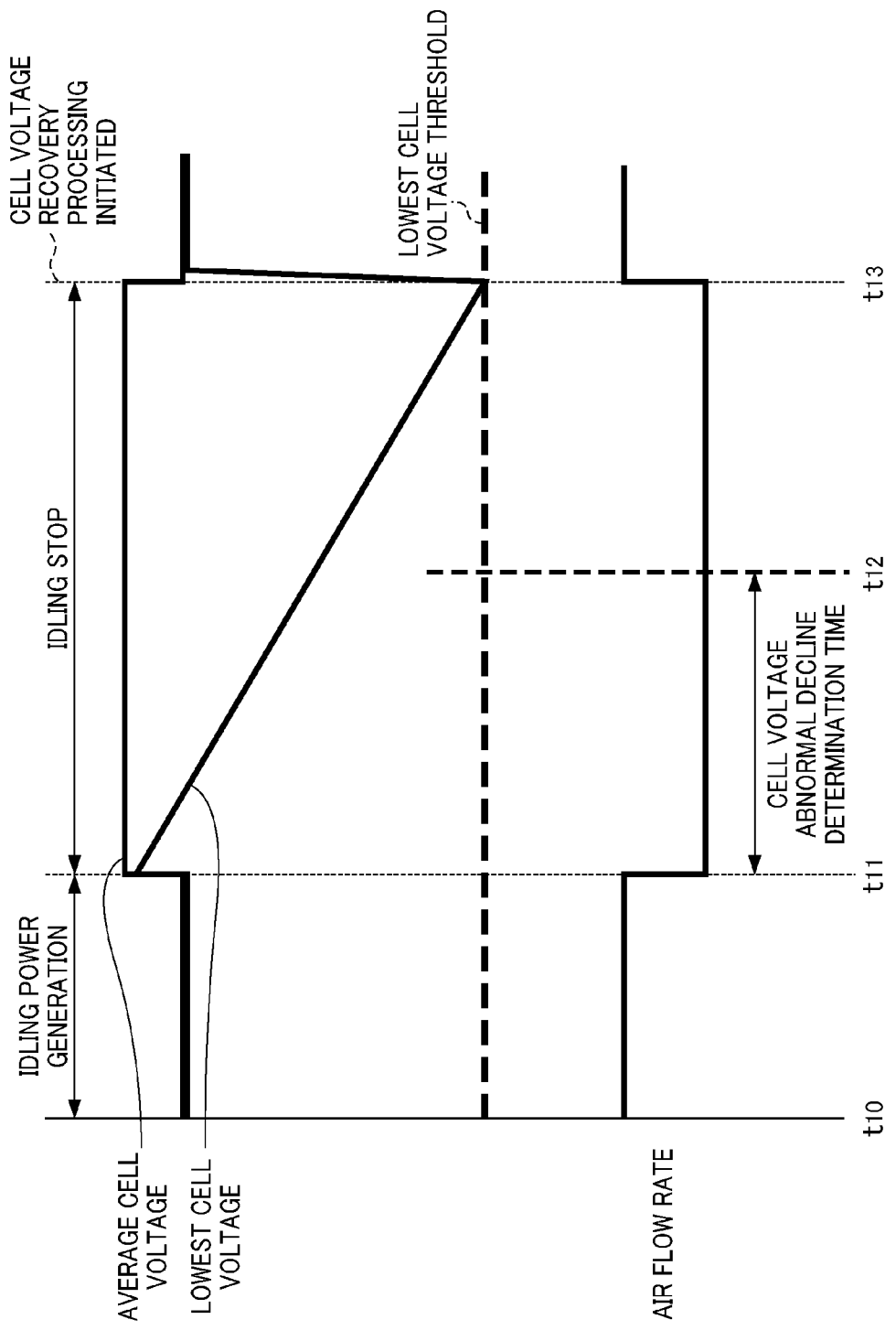
FIG. 3 is a time chart showing a control example in a case of a decline in cell voltage being normal in the cell voltage recovery control according to the first embodiment.

FIG. 3 is a time chart showing a control example in a case of the decline in cell voltage being normal in the cell voltage recovery control according to the present embodiment.

It should be noted that, in the fuel cell system of the present embodiment as described above, the air flow rate is set according to the current command value, and the hydrogen flow rate is set according to the air pressure based on the air flow rate thus set; therefore, the flow rate of air (pressure, stoichiometry), flow rate of hydrogen (pressure, stoichiometry) and output current all exhibit similar changes. As a result, in FIG. 3, only the air flow rate is shown among these (similarly done for FIG. 4 described later).

First, at time $t_{10}$ to $t_{11}$, idling power generation is executed. More specifically, the idling power generation current command value is output to the VCU, and a command value for the air pump revolution speed according to this idling power generation current command value is output to the air pump. Air and hydrogen of low flow rates compared to during normal operation when the vehicle is traveling are thereby supplied, and the discharge current declines compared to during normal power generation. It should be noted that, at this time, the average cell voltage and lowest cell voltage are almost identical, and an abnormality in the cell voltage is not confirmed.

Next, at time $t_{11}$ to $t_{13}$, the idling stop control of the present embodiment is executed. More specifically, as described above, the idling stop current command value is output to the VCU, and a command value for the air pump revolution speed according to this idling stop current command value is output to the air pump. Air and hydrogen of lower flow rates than during idling power generation are thereby supplied, and the air flow rate declines as shown in FIG. 3. In addition, since the discharge current declines more than during idling power generation, the average cell voltage and the lowest cell voltage both increase somewhat at time $t_{11}$. Subsequently, during the period until time $t_{13}$, a great change in the average cell voltage is not observed, while the lowest cell voltage gradually decreases.

It should be noted that the lowest cell voltage has not fallen below the lowest cell voltage threshold at time $t_{12}$ at which the cell voltage abnormal decline determination time has elapsed since time $t_{11}$ at which the idling stop control was initiated. As a result, recovery of the cell voltage is still not necessary at time $t_{12}$, and the supply of air of a low flow rate is continued (refer to Step S2 in FIG. 2).

Next, at time $t_{13}$, the lowest cell voltage falls below the lowest cell voltage threshold; therefore, it is determined that the flooding phenomenon occurs, and it is necessary to recover the cell voltage by resolving the flooding phenomenon, and thus the cell voltage is made to recover by increasing the flow rate of air. At this time, since the cell voltage abnormal decline determination time has already elapsed since time $t_{11}$ at which the idling stop control was initiated, it is determined that the flooding phenomenon can be resolved if increased to the air flow rate of during idling power generation, then the idling power generation current command value is output to the VCU, and a command value for the air pump revolution speed according to this idling power generation current command value is output to the air pump (refer to Step S4 in FIG. 2). The air flow rate thereby increases to the same amount as during idling power generation as shown in FIG. 3, and the lowest cell voltage immediately recovers.

Figure 4:
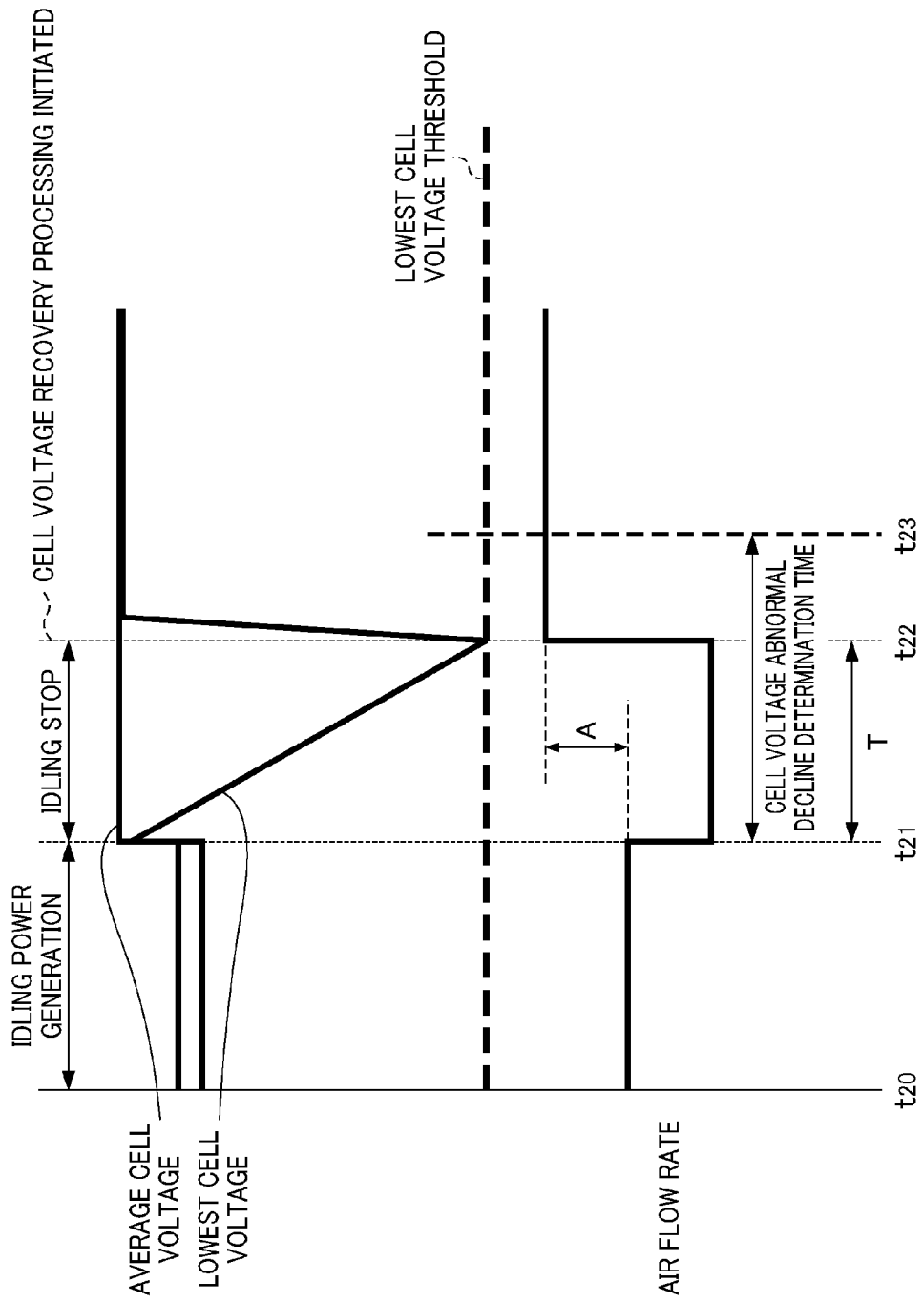
FIG. 4 is a time chart showing a control example in a case of the decline in cell voltage being abnormal in the cell voltage recovery control according to the first embodiment.

In addition, FIG. 4 is a time chart showing a control example in a case of the decline in cell voltage being abnormal in the cell voltage recovery control according to the present embodiment.

First, at time $t_{20}$ to $t_{21}$, idling power generation is executed. More specifically, the idling power generation current command value is output to the VCU, and a command value for the air pump revolution speed according to this idling power generation current command value is output to the air pump. Air and hydrogen of low flow rates compared to during normal operation when the vehicle is traveling are supplied, and the discharge current declines compared to during normal power generation. It should be noted that, at this time, the lowest cell voltage is somewhat low compared to the average cell voltage, and some abnormality in the cell voltage is confirmed.

Next, at time $t_{21}$ to $t_{22}$, idling stop control of the present embodiment is executed. More specifically, as described above, the idling stop current command value is output to the VCU, and a command value for the air pump revolution speed according to this idling stop current command value is output to the air pump. Air of a lower flow rate than during idling power generation is thereby supplied, and the air flow rate declines as shown in FIG. 4. In addition, since the discharge current declines more than during idling power generation, the average cell voltage and the lowest cell voltage both increase somewhat at time $t_{21}$. Subsequently, during the period until time $t_{22}$, a great change in the average cell voltage is not observed, while the lowest cell voltage suddenly decreases.

Next, at time $t_{22}$, since the lowest cell voltage falls below the lowest cell voltage threshold, it is determined that the flooding phenomenon occurs and it is necessary to recover the cell voltage by resolving the flooding phenomenon, and thus the cell voltage is made to recover by increasing the air flow rate. At this time, since the time period since time $t_{21}$ at which the idling stop control was initiated is within the cell voltage abnormal decline determination time, it is determined that the flooding phenomenon occurs excessively and the decline in the cell voltage is abnormal, and thus the flooding phenomenon cannot be adequately resolved if the air flow rate is not increased to more than during idling power generation, then the abnormal cell voltage recovery current command value is output to the VCU, and a command value for the air pump revolution speed according to this abnormal cell voltage recover current command value is output to the air pump (refer to Step S5 in FIG. 2). The air flow rate thereby increases more than during idling power generation as shown in FIG. 4, and the lowest cell voltage immediately recovers.

In addition, at this time, the amount of increase in the air flow rate (amount of increase A in FIG. 4) is set depending on the time period since time $t_{21}$ at which idling stop control was initiated until time $t_{22}$ at which the lowest cell voltage falls below the lowest cell voltage threshold (cell voltage decline time T in FIG. 4). More specifically, as the cell voltage decline time T shortens, it is determined that the occurrence of the flooding phenomenon is more considerable and the decline in cell voltage abnormal: therefore, the amount of increase A is set to be larger in order to more reliably resolve the flooding phenomenon and make the cell voltage recover.

The following such effects are exerted according to the present embodiment.

(1) First, according to the present embodiment, since current is produced from the fuel cell 10 during idling stop, it is possible to avoid an OCV state in which the output current value is 0, and degradation of the electrolyte membrane due to a change to high potential of the fuel cell 10 can be suppressed.

In addition, according to the present embodiment, the current produced from the fuel cell 10 during idling stop is set to lower current than during idling power generation; therefore, it is possible to suppress a decline in the cell voltage during idling stop.

Furthermore, according to the present embodiment, air is supplied to the fuel cell 10 during idling stop; therefore, oxidant off-gas (air) for diluting the fuel off-gas (hydrogen) staying in the diluter 50 can be ensured. As a result, the dilution gas (air) amount that must be ensured in advance can be decreased, and it is possible to quickly transition to idling stop. The fuel consumption can also be improved thereby.

In addition, according to the present embodiment, since air is supplied during idling stop, the oxygen amount staying in the vicinity of the electrolyte membrane during the occurrence of the cross-leakage phenomenon or the like can be decreased; therefore, hydrogen and oxygen can be suppressed from reacting at high concentrations in the vicinity of the electrolyte membrane, and thus degradation of the electrolyte membrane can be suppressed.

Furthermore, according to the present embodiment, since air is supplied during idling stop, the current produced from the fuel cell 10 can be consumed by the driving of the air pump 21. The current produced by the fuel cell 10 can thereby be consumed irrespective of whether or not in a state capable of recharging the high-voltage battery 16; therefore, there is no necessity to provide a discharge resistor.

Moreover, according to the present embodiment, the air flow rate supplying the fuel cell 10 during idling stop is a lower flow rate than during idling power generation; therefore, it is possible to decrease the supply of unneeded air and deterioration in the efficiency of the fuel cell system 1 can be suppressed, while obtaining the aforementioned effects.

(2) Usually, the water produced during power generation will be discharged to outside the system by the reactant gas supplied. However, in a case of the flow rate of air being low as during idling stop of the present embodiment, for example, the water in the air supply line 23 and cathode channel 14 will not be completely discharged, and the flooding phenomenon will occur, blocking these channels. When the flooding phenomenon occurs, the air becomes unable to circulate; therefore, the hydrogen and oxygen will react at high concentrations in the vicinity of the electrolyte membrane, and it will no longer be able to suppress degradation of the electrolyte membrane.

In addition, when the flooding phenomenon occurs, the lowest cell voltage of the fuel cell 10 greatly declines. In this case, the cell voltage immediately after returning from idling stop becomes unstable, and current limitation may become necessary.

Therefore, according to the present embodiment, in a case of the lowest cell voltage of the fuel cell 10 falling below the predetermined lowest cell voltage threshold during idling stop, it is determined that it is necessary to resolve the flooding phenomenon, and the flow rate of air supplying the fuel cell 10 is increased. Since the flooding phenomenon is thereby resolved, it is possible to suppress degradation of the electrolyte membrane as well as being able to recover the cell voltage, and a stable cell voltage can be ensured immediately after returning from idling stop.

(3) In a case of the lowest cell voltage falling below the predetermined lowest cell voltage threshold within a predetermined time after initiating idling stop control, this abnormal decline in cell voltage is considered to be caused by the flooding phenomenon occurring excessively and a large amount of water blocking the insides of the air supply line 23 and cathode channel 14. As a result, even if trying to increase the flow rate of air supplying the fuel cell 10, in the case of the flow rate thereof being low, it may not be possible to adequately resolve the flooding phenomenon.

Therefore, according to the present embodiment, in a case of the cell voltage decline time being within a predetermined time, the flow rate of air is increased to more than during idling power generation. Since the flooding phenomenon is thereby reliably resolved, it is possible to suppress degradation of the electrolyte membrane as well as being able to recover the cell voltage, and a stable cell voltage can be ensured immediately after returning from idling stop.

(4) According to the present embodiment, the flow rate of air increases as the cell voltage more suddenly declines and the cell voltage decline time shortens. In other words, the air flow rate supplying the fuel cell 10 increases depending on the extent of occurrence of the flooding phenomenon. Since the flooding phenomenon is thereby more reliably resolved, it is possible to suppress degradation of the electrolyte membrane as well as being able to recover the cell voltage, and a stable cell voltage can be ensured immediately after returning from idling stop.

It should be noted that the present invention is not to be limited to the above-mentioned embodiment, and that modifications, improvements, etc. within a scope that can achieve the object of the present invention are included in the present invention.

For example, although configured to supply air and hydrogen of low flow rates during the idling stop control in the above-mentioned embodiment, it is not limited thereto. For example, it may be configured to supply only air of a low flow rate without supplying hydrogen.

Second Embodiment

Figure 5:
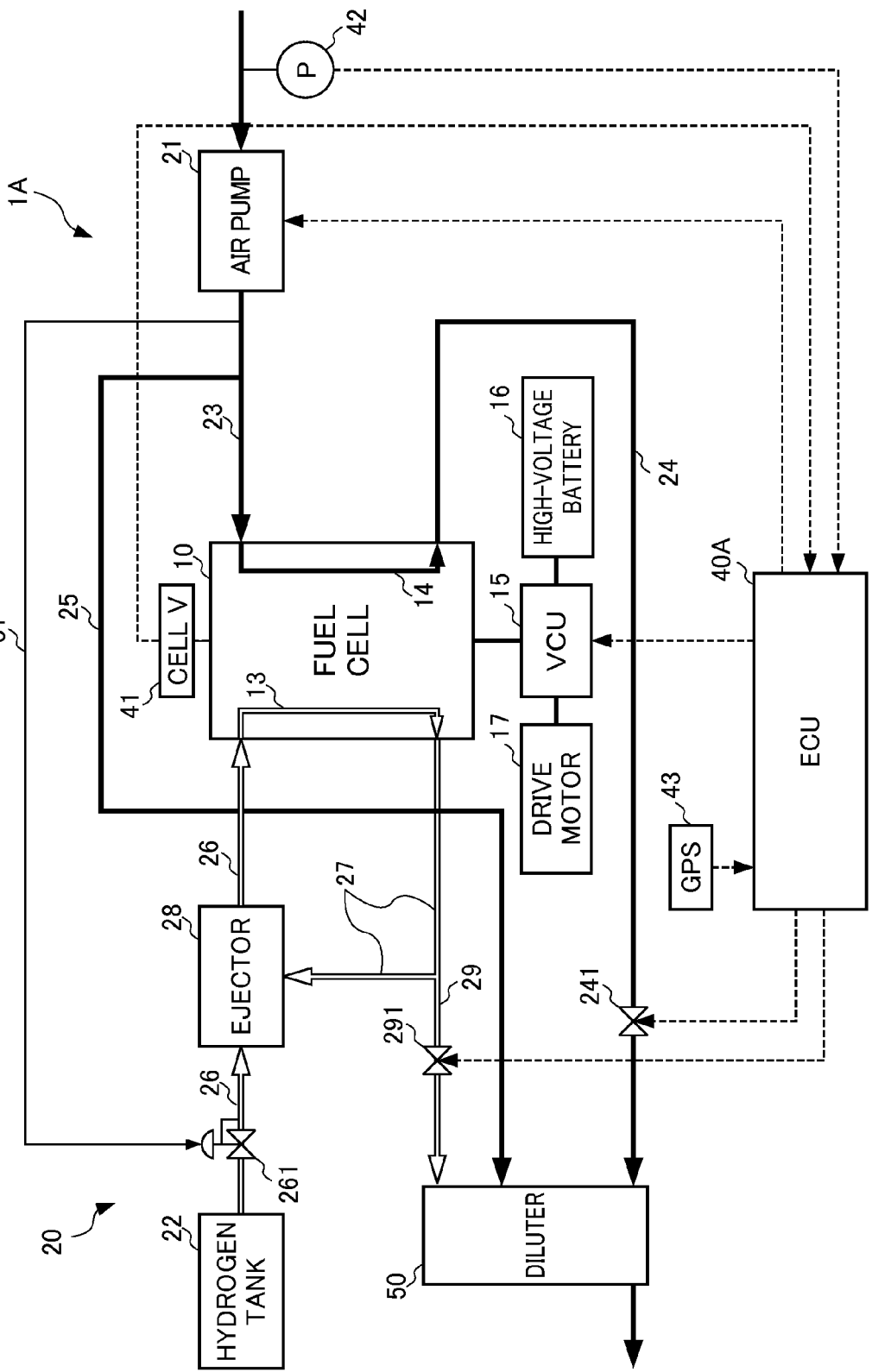
FIG. 5 is a block diagram showing a fuel cell system according to a second embodiment of the present invention.

FIG. 5 is a block diagram of a fuel cell system 1A according to a second embodiment.

The fuel cell system 1A includes a fuel cell 10, a supply device 20 that supplies reactant gas to this fuel cell 10, and an electronic control unit (hereinafter referred to as "ECU") 40A that controls this fuel cell 10 and this supply device 20. This fuel cell system 1A is equipped to a fuel cell vehicle not illustrated that has electric power generated by the fuel cell 10 as the source of power, for example.

The configurations of the fuel cell 10 and supply device 20 are similar to the first embodiment. The air pump 21, back-pressure valve 241, dilution gas shutoff valve, hydrogen shutoff valve and purge valve 291 are electrically connected to the ECU 40A, and are controlled by the ECU 40A.

The hardware configuration of the ECU 40A is similar to the first embodiment. In addition, a cell voltage sensor 41, atmospheric pressure sensor 42 and GPS sensor 43 are electrically connected to the ECU 40A. The detection signals of these sensors are transmitted to the ECU 40A.

The cell voltage sensor 41 detects the cell voltage of each of the plurality of fuel cells constituting the fuel cell 10. Among the cell voltages of each of the fuel cells detected, the ECU 40A sets the cell voltage that is the lowest as the lowest cell voltage.

It should be noted that the cell voltage sensor 41 may be configured so as to define at least two among the plurality of fuel cells as one fuel cell group, and detect the voltage of each of these fuel cell groups. In this case, the ECU 40A defines the voltage that is the lowest among the voltages of each of the fuel cell groups as the lowest cell voltage.

The atmospheric pressure sensor 42 is provided at the air intake of the air pump 21, and precisely detects the atmospheric pressure of the current position.

The GPS sensor 43 is provided to a navigation system that is not illustrated, and receives GPS signals transmitted from GPS satellites to precisely detect the longitude, latitude and elevation of the current position of the fuel cell vehicle.

The ECU 40A includes an idling stop control part, low-pressure environment determination part, operation limitation part, cell voltage threshold determination part, cell voltage decline time determination part and cell voltage recovery part, as modules for executing the idling stop control, upper limit control and cell voltage recovery control described later.

The configuration of the idling stop control part is similar to the first embodiment.

The low-pressure environment determination part determines whether the fuel cell vehicle is in a low-pressure environment during execution of the above-mentioned idling stop control.

More specifically, the low-pressure environment determination part determines that the fuel cell vehicle is in a low-pressure environment in a case corresponding to either the atmospheric pressure detected by the atmospheric pressure sensor 42 falling below a predetermined atmospheric pressure threshold, or the elevation of the current position detected by the GPS sensor 43 exceeding a predetermined elevation threshold.

In order to ensure an air flow rate to supply during idling stop control, for example, the predetermined atmospheric pressure threshold is set to an atmospheric pressure when the revolution speed of the operating air pump 21 increases and the NV performances starts to deteriorate. Similarly, in order to ensure an air flow rate to supply during idling stop control, for example, the predetermined elevation threshold is set to an elevation when the revolution speed of the operating air pump 21 increases and the NV performances starts to deteriorate.

The operation limitation part limits operation of the air pump 21 in a case of it having been determined by the low-pressure environment determination part that the fuel cell vehicle is in a low-pressure environment during execution of the above-mentioned idling stop control.

More specifically, upper limit control is executed to set a predetermined upper limit for the revolution speed of the air pump 21, and allow the air pump 21 to operate at no more than this upper limit.

The predetermined upper limit is set to an upper limit of the revolution speed (e.g., 700 rpm) at which favorable NV performance of the fuel cell system 1 can be ensured during idling stop control.

The cell voltage threshold determination part determines whether the lowest cell voltage of the fuel cell 10 falls below a predetermined lowest cell voltage threshold during the above-mentioned upper limit control.

In more detail, the cell voltage threshold determination part acquires the lowest cell voltage that is the lowest among the cell voltages of each of the fuel cell cells detected by the cell voltage sensor 41, and determines whether or not the lowest cell voltage thus acquired falls below the predetermined lowest cell voltage threshold.

Herein, the predetermined lowest cell voltage threshold is no more than the cell voltage initiating current limitation from the viewpoint of protection of the fuel cell 10 during normal power generation when the vehicle is traveling, and is set to a value that does not bring about a negative voltage. The discharge current command value is thereby avoided from being allowed to increase irrespective of there being a necessity of initiate current limitation, whereby stable cell voltage is ensured.

The cell voltage decline time determination part determines whether or not the time period from initiating the above-mentioned idling stop control until the lowest cell voltage of the fuel cell 10 falls below the above-mentioned lowest cell voltage threshold (hereinafter referred to as "cell voltage decline time") during the above-mentioned upper limit control is within a predetermined time (hereinafter referred to as "cell voltage abnormal decline determination time").

In more detail, the cell voltage decline time determination part acquires the above-mentioned cell voltage decline time by measuring with a timer, and determines whether or not the cell voltage decline time thus acquired is within the above-mentioned cell voltage abnormal decline determination time. Herein, the cell voltage abnormal decline determination time is set by performing experiments in advance.

The cell voltage recovery control part executes cell voltage recovery control to recover the cell voltage during the above-mentioned upper limit control.

More specifically, the cell voltage recovery control part increases the flow rate of air supplying the fuel cell 10 in a case of having determined that the lowest cell voltage of the fuel cell 10 falls below the lowest cell voltage threshold, by way of the above-mentioned cell voltage threshold determination part.

In addition, the air flow rate is increased to more than during idling power generation in a case of having determined that the cell voltage decline time is within the cell voltage abnormal decline determination time, by way of the above-mentioned cell voltage decline time determination part. More specifically, the discharge current becomes greater than during idling power generation by outputting a current command value (hereinafter referred to as "abnormal cell voltage recovery current command value") higher than the idling power generation current command value to the VCU 15. In addition, depending on the abnormal cell voltage recovery current command value, an air flow rate of a higher flow rate than during idling power generation is set, and a command value of the air pump revolution speed corresponding to the air flow rate thus set is output to the air pump 21. Air of a higher flow rate than during idling power generation is thereby supplied to the fuel cell 10. In addition, signal pressure corresponding to the air of high flow rate is input to the regulator 261, and hydrogen of a higher flow rate than during idling power generation is supplied to the fuel cell 10. In other words, power generation is performed at a higher stoichiometry than during idling power generation.

In addition, the cell voltage recovery control part increases the air flow rate with a shorter cell voltage decline time, in a case of having determined that the cell voltage decline time is within the cell voltage abnormal decline determination time. In other words, a current command value in accordance with the cell voltage decline time is output to the VCU 15, and a command value of the air pump revolution speed in accordance with this current command value is output to the air pump 21. The air flow rate and hydrogen flow rate are thereby increased in accordance with the cell voltage decline time, i.e. extent of occurrence of the flooding phenomenon.

Hereinafter, the sequence of upper limit control processing to limit the upper limit of the air pump revolution speed during idling stop control will be explained in detail while referencing FIG. 6.

Figure 6:
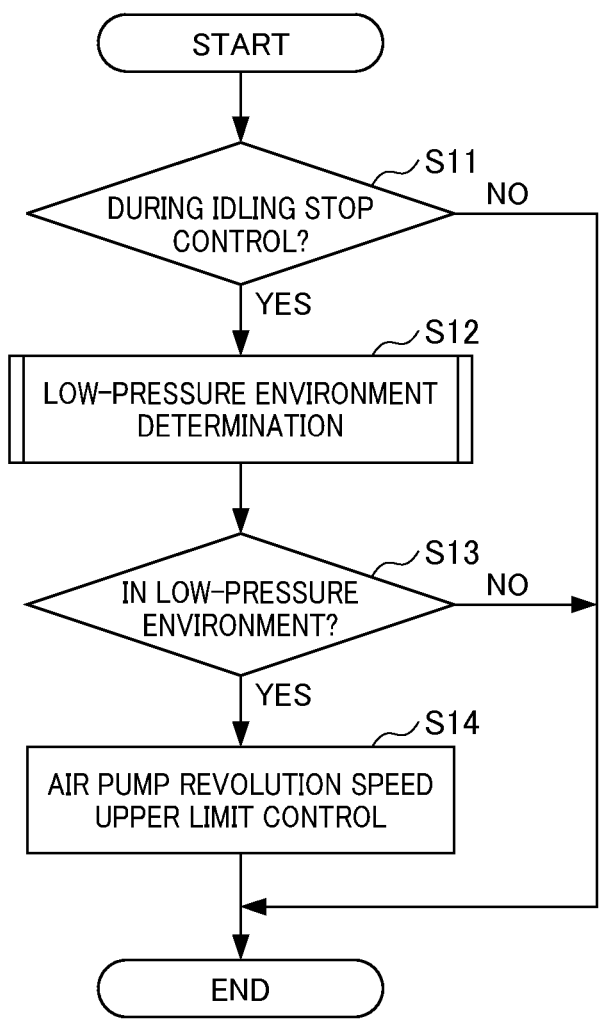
FIG. 6 is a flowchart showing a sequence of upper limit control processing to limit the upper limit of an air pump revolution speed during idling stop control according to the second embodiment.

FIG. 6 is a flowchart showing a sequence of upper limit control processing to limit the upper limit of the air pump revolution speed during idling stop control. The processing shown in FIG. 6 is initiated in response to the ignition switch being turned ON, and is repeatedly executed every predetermined control cycle by the ECU.

In Step S11, it is determined whether or not being during idling stop control. In a case of this determination being YES, the processing advances to Step S12, and in a case of being NO, the present processing is terminated.

In Step S12, after low-pressure environment determination to determine whether or not the fuel cell vehicle is in a low-pressure environment has been executed, the processing advances to Step S13. It should be noted that the sequence of low-pressure environment determination will be explained while referencing FIG. 7 at a later stage.

In Step S13, it is determined whether or not the fuel cell vehicle is in a low-pressure environment based on the determination result of Step S12. In a case of this determination being YES, it is determined that there is a necessity to limit the operation of the air pump in order to ensure favorable NV performance, and then the processing advances to Step S14. In a case of this determination being NO, it is determined that favorable NV performance can be ensured even without limiting the operation of the air pump, and then the present processing is terminated.

In Step S14, the operation of the air pump is limited, and then the present processing is terminated. More specifically, upper limit control is executed to set a predetermined upper limit for the revolution speed of the air pump, and allow the air pump to operate at no more than this upper limit. The operation of the air pump is thereby limited, and favorable NV performance is ensured.

Figure 7:
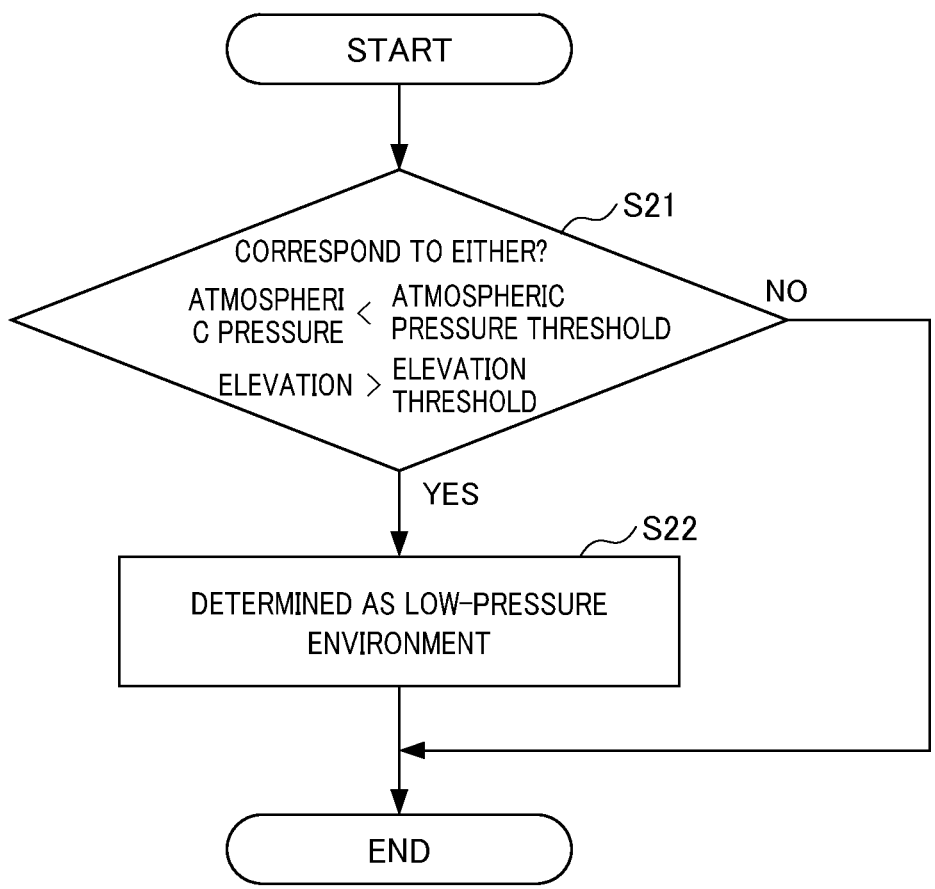
FIG. 7 is a flowchart showing a sequence of low-pressure environment determination processing to determine whether being in a low-pressure environment during idling stop control according to the second embodiment.

FIG. 7 is a flowchart showing a sequence of low-pressure environment determination processing to determine whether being in a low-pressure environment during idling stop control by way of the ECU.

In Step S21, it is determined whether corresponding to a case of either the atmospheric pressure detected by the atmospheric pressure sensor falling below a predetermined atmospheric pressure threshold, or the elevation of the current position detected by the GPS sensor exceeding a predetermined elevation threshold. In a case of corresponding to at least either one and this determination being YES, the processing advances to Step S22, and then the fuel cell vehicle is determined as being in a low-pressure environment, and the present processing is terminated. In a case of not corresponding to either one and this determination being NO, the fuel cell vehicle is determined as not being in a low-pressure environment, and the present processing is terminated.

Herein, since the air flow rate is also limited by the operation of the air pump being limited in the upper limit control of the present embodiment, the flooding phenomenon occurs blocking the gas channel by water inside the gas channel not being completely discharged occurs. When the flooding phenomenon occurs, air becomes unable to flow therethrough; therefore, the hydrogen and oxygen will react at high concentrations in the vicinity of the electrolyte membrane, and it will no longer be possible to suppress degradation of the electrolyte membrane. In addition, when the flooding phenomenon occurs, the lowest cell voltage of the fuel cell stack greatly declines. In this case, the cell voltage immediately after returning from idling stop becomes unstable, and current limitation may become necessary.

Therefore, in the present embodiment, cell voltage recovery control is executed by the above-mentioned cell voltage recovery control part during the upper limit control. Hereinafter, cell voltage recovery control of the present embodiment will be explained while referencing FIG. 8.

Figure 8:
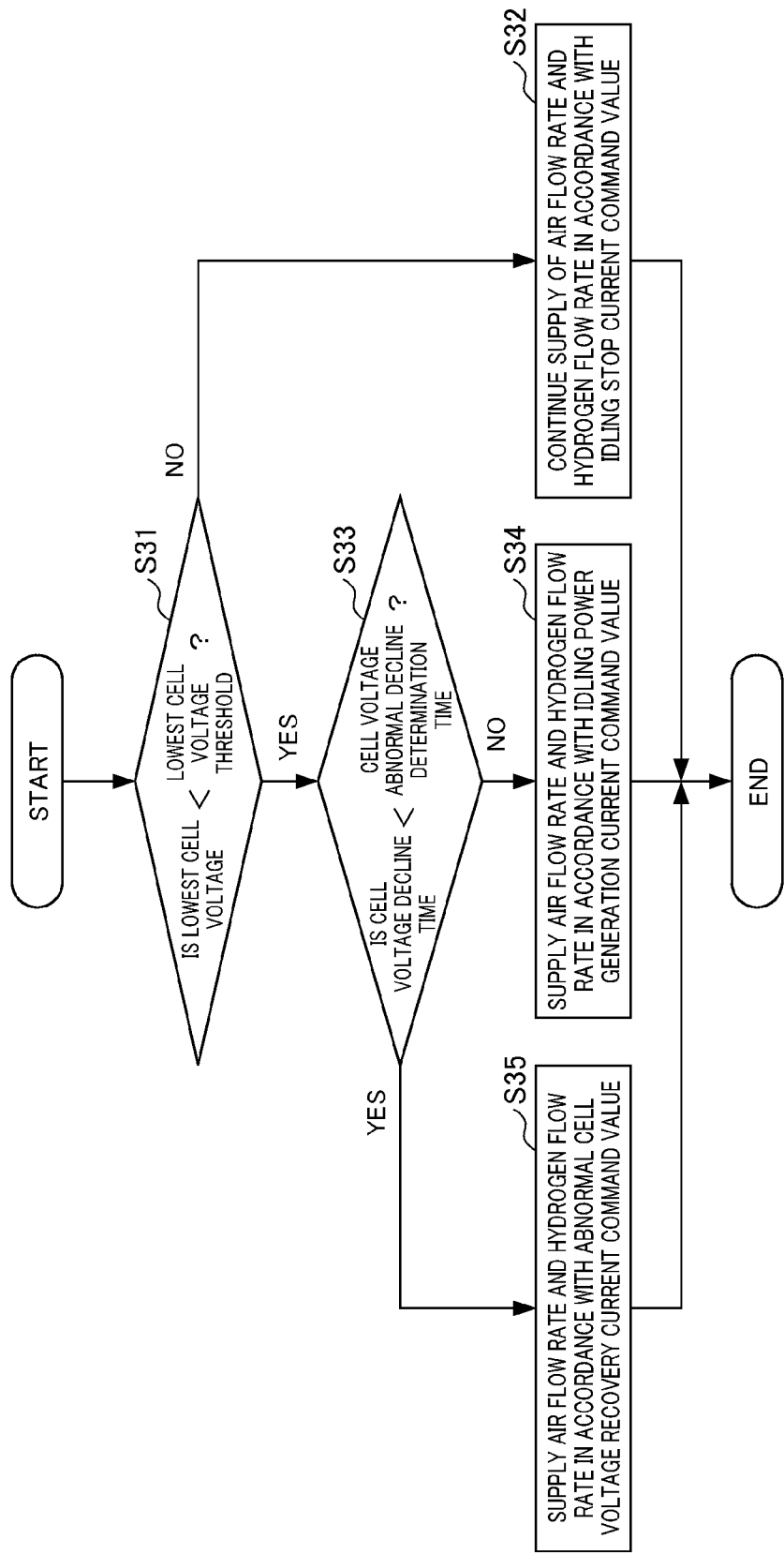
FIG. 8 is a flowchart showing a sequence of cell voltage recovery control processing to recover cell voltage during upper limit control according to the second embodiment.

FIG. 8 is a flowchart showing a sequence of cell voltage recovery control processing to recover cell voltage during upper limit control.

In Step S31, it is determined whether the lowest cell voltage of the fuel cell falls below the predetermined lowest cell voltage threshold during upper limit control. In a case of this determination being YES, it is determined that the flooding phenomenon occurs and there is a necessity to recover the cell voltage by resolving the flooding phenomenon, and then the processing advances to Step S33. In a case of this determination being NO, it is determined that there is no necessity to recover the cell voltage, and the processing advances to Step S32.

In Step S32, the idling stop current command value is output to the VCU, and the supply of air and hydrogen of low flow rates in accordance with the idling stop current command value is continued. In other words, the idling stop control is continued, and the present processing is terminated.

In Step S33, it is determined whether the cell voltage decline time is within a predetermined cell voltage abnormal decline determination time. In the case of this determination being YES, an abnormal decline of the cell voltage is recognized due to the occurrence of the flooding phenomenon, and it is determined that the flooding phenomenon cannot be resolved if the air flow rate is not increased to more than during idling power generation, and then the processing advances to Step S35. In the case of this determination being NO, a normal decline of the cell voltage is recognized, it is determined that the flooding phenomenon can be resolved if increased to an air flow rate of the same amount as during idling power generation, and then the processing advances to Step S34.

In Step S34, the idling power generation current command value is output to the VCU, and air and hydrogen of flow rates according to the idling power generation current command value, which are higher than the flow rates according to the idling stop current command value, are supplied. The air and hydrogen of higher flow rates come to be supplied, a result of which the flooding phenomenon is resolved, and the degradation of the electrolyte membrane is suppressed, while the cell voltage recovers. The idling stop control and upper limit control are thereby cancelled, and the present processing is terminated.

In Step S35, the abnormal cell voltage recovery current command value is output to the VCU, and air and hydrogen of flow rates according to the abnormal cell voltage recovery current command value, which are even higher than the flow rates according to the idling power generation current command value, are supplied. Air and hydrogen of even higher flow rates come to be supplied, a result of which the flooding phenomenon is more reliably resolved, and degradation of the electrolyte membrane is suppressed, while the cell voltage recovers. The idling stop control and upper limit control are thereby cancelled, and the present processing is terminated.

Figure 9:
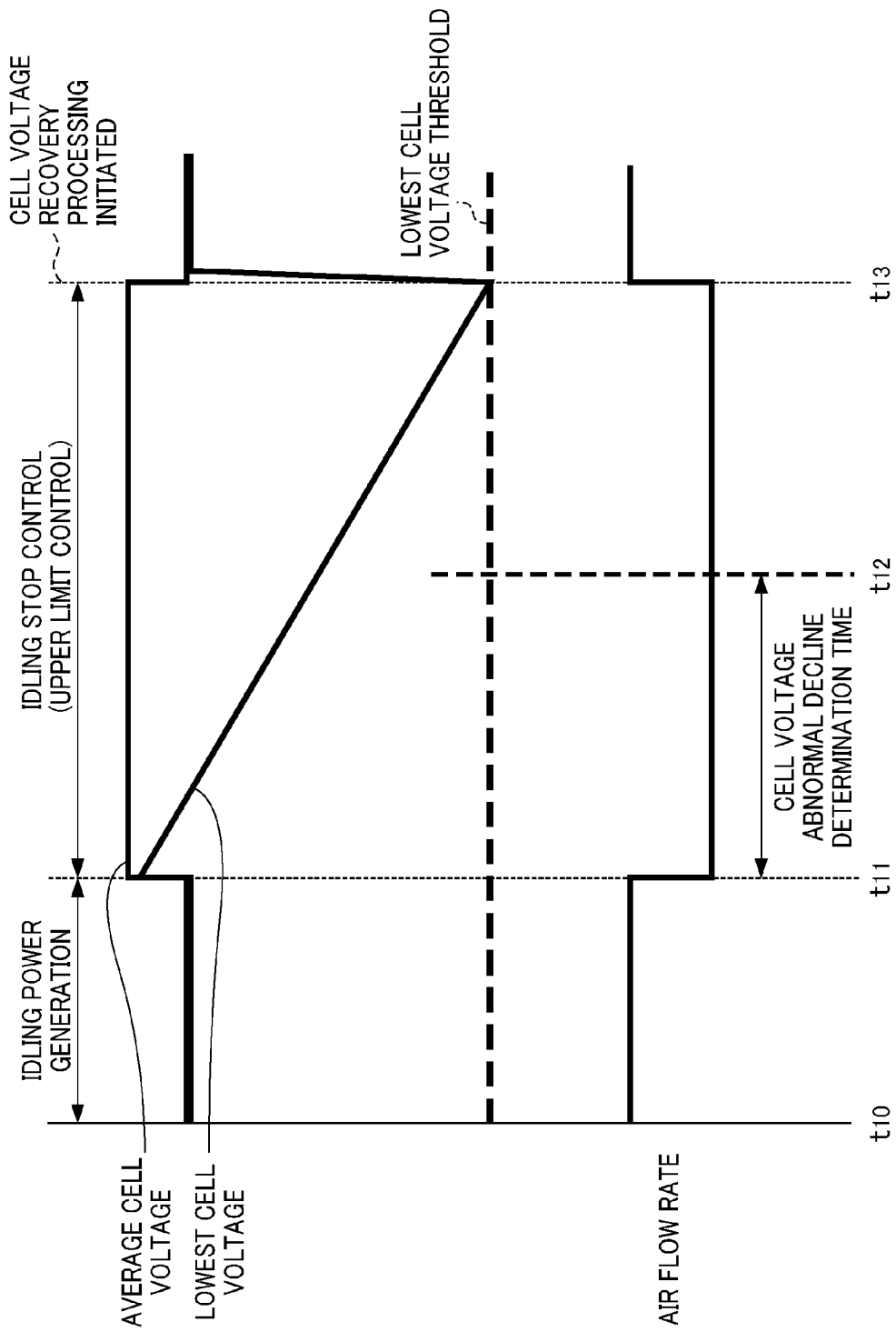
FIG. 9 is a time chart showing a control example in a case of the decline in cell voltage in cell voltage recovery control according to the second embodiment being normal.

FIG. 9 is a time chart showing a control example in a case of the decline in cell voltage in cell voltage recovery control according to the present embodiment being normal. The control example shown in FIG. 9 executes idling stop control for a fuel cell vehicle in a low-pressure environment.

It should be noted that, in the fuel cell system of the present embodiment as described above, the air flow rate is set according to the current command value, and the hydrogen flow rate is set according to the air pressure based on the air flow rate thus set; therefore, the flow rate of air (pressure, stoichiometry), flow rate of hydrogen (pressure, stoichiometry) and output current all exhibit similar changes. As a result, in FIG. 9, only the air flow rate is shown among these (similarly done for FIG. 10 described later).

First, at time $t_{10}$ to $t_{11}$, idling power generation is executed. More specifically, the idling power generation current command value is output to the VCU, and a command value for the air pump revolution speed according to this idling power generation current command value is output to the air pump. Air and hydrogen of low flow rates compared to during normal operation when the vehicle is traveling are thereby supplied, and the discharge current declines compared to during normal power generation. It should be noted that, at this time, the average cell voltage and lowest cell voltage are almost identical, and an abnormality in the cell voltage is not confirmed.

Next, at time $t_{11}$ to $t_{13}$, the idling stop control of the present embodiment is executed. More specifically, as described above, the idling stop current command value is output to the VCU, and a command value for the air pump revolution speed according to this idling stop current command value is output to the air pump. At this time, since the fuel cell vehicle is in a low-pressure environment, upper limit control to limit the operation of the air pump is jointly executed.

Air and hydrogen of lower flow rates than during idling power generation are thereby supplied in a state in which the NV performance is ensured, and the air flow rate declines as shown in FIG. 9. In addition, the discharge current declines more than during idling power generation, and thus the average cell voltage and the lowest cell voltage both increase somewhat at time $t_{11}$. Subsequently, during the period until time $t_{13}$, a great change in the average cell voltage is not observed, while the lowest cell voltage gradually decreases.

It should be noted that the lowest cell voltage has not fallen below the lowest cell voltage threshold at time $t_{12}$ at which the cell voltage abnormal decline determination time has elapsed since time $t_{11}$ at which the idling stop control was initiated. As a result, it is determined that recovery of the cell voltage is still not necessary at time $t_{12}$, and the supply of air of a low flow rate is continued (refer to Step S32 in FIG. 8).

Next, at time $t_{13}$, the lowest cell voltage falls below the lowest cell voltage threshold; therefore, it is determined that the flooding phenomenon occurs, and it is necessary to recover the cell voltage by resolving the flooding phenomenon, and thus the cell voltage is made to recover by increasing the flow rate of air. At this time, since the cell voltage abnormal decline determination time has already elapsed since time $t_{11}$ at which the idling stop control was initiated, it is determined that the flooding phenomenon can be resolved if increased to the air flow rate of during idling power generation, then the idling power generation current command value is output to the VCU, and a command value for the air pump revolution speed according to this idling power generation current command value is output to the air pump (refer to Step S34 in FIG. 8). The idling stop control and upper limit control are thereby cancelled, the air flow rate increases to the same amount as during idling power generation as shown in FIG. 9, and the lowest cell voltage immediately recovers.

Figure 10:
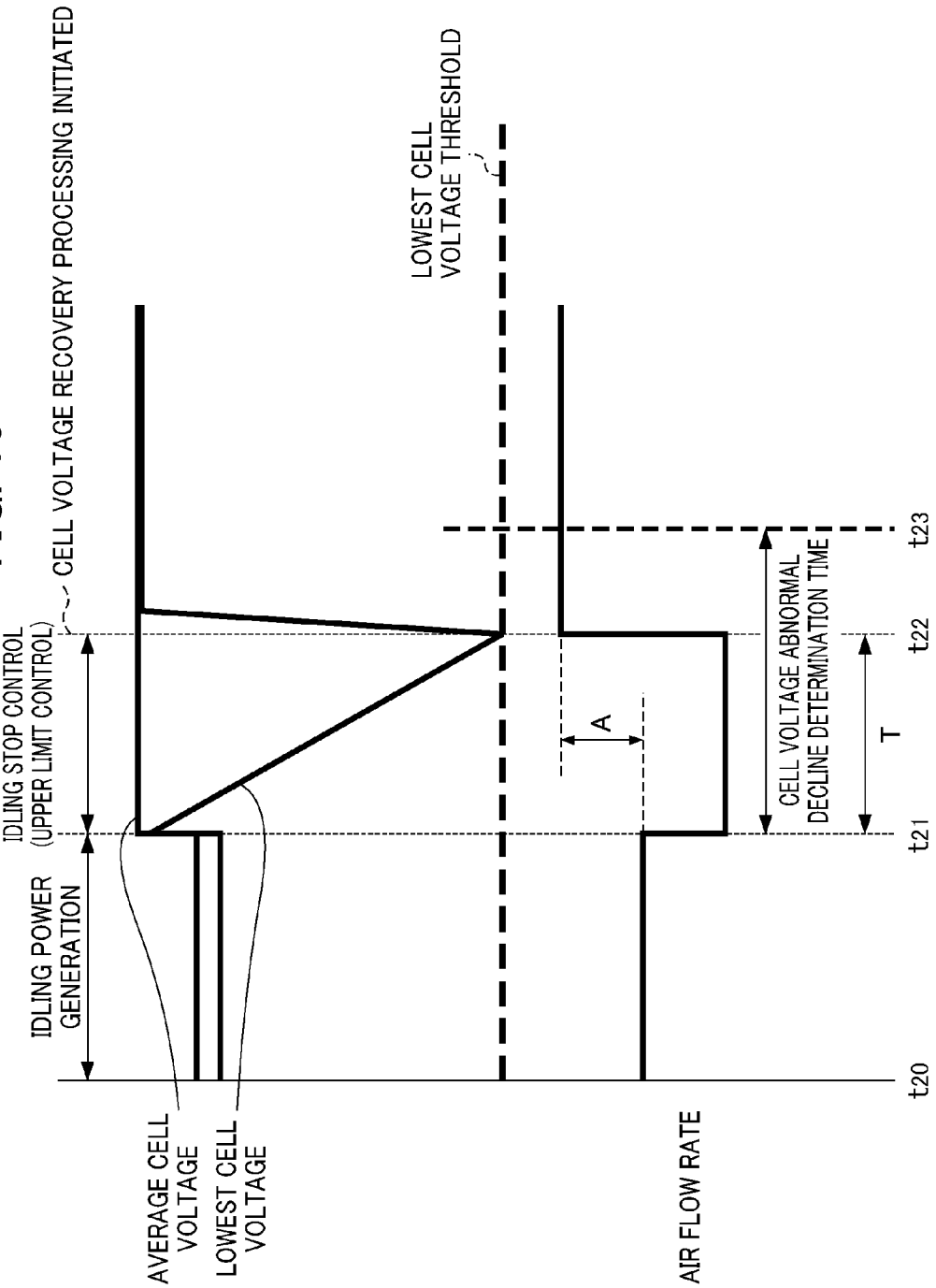
FIG. 10 is a time chart showing a control example in a case of the decline in cell voltage in the cell voltage recovery control according to the second embodiment being abnormal.

In addition, FIG. 10 is a time chart showing a control example in a case of the decline in cell voltage in the cell voltage recovery control according to the present embodiment being abnormal. The control example shown in FIG. 10 executes idling stop control for a fuel cell vehicle in a low-pressure environment.

First, at time $t_{20}$ to $t_{21}$, idling power generation is executed. More specifically, the idling power generation current command value is output to the VCU, and a command value for the air pump revolution speed according to this idling power generation current command value is output to the air pump. Air and hydrogen of low flow rates compared to during normal operation when the vehicle is traveling are supplied, and the discharge current declines compared to during normal power generation. It should be noted that, at this time, the lowest cell voltage is somewhat low compared to the average cell voltage, and some abnormality in the cell voltage is confirmed.

Next, at time $t_{21}$ to $t_{22}$, idling stop control of the present embodiment is executed. More specifically, as described above, the idling stop current command value is output to the VCU, and a command value for the air pump revolution speed according to this idling stop current command value is output to the air pump. At this time, since the fuel cell vehicle is in a low-pressure environment, upper limit control to limit the operation of the air pump is jointly executed.

Air of a lower flow rate than during idling power generation is thereby supplied in a state in which the NV performance is ensured, and the air flow rate declines as shown in FIG. 10. In addition, since the discharge current declines more than during idling power generation, the average cell voltage and the lowest cell voltage both increase somewhat at time $t_{21}$. Subsequently, during the period until time $t_{22}$, a great change in the average cell voltage is not observed, while the lowest cell voltage suddenly decreases.

Next, at time $t_{22}$, since the lowest cell voltage falls below the lowest cell voltage threshold, it is determined that the flooding phenomenon occurs and it is necessary to recover the cell voltage by resolving the flooding phenomenon, and thus the cell voltage is made to recover by increasing the air flow rate. At this time, since the time period since time $t_{21}$ at which the idling stop control was initiated is within the cell voltage abnormal decline determination time, it is determined that the flooding phenomenon occurs excessively and the decline in the cell voltage is abnormal, and thus the flooding phenomenon cannot be adequately resolved if the air flow rate is not increased to more than during idling power generation, then the abnormal cell voltage recovery current command value is output to the VCU, and a command value for the air pump revolution speed according to this abnormal cell voltage recover current command value is output to the air pump (refer to Step S35 in FIG. 8). The idling stop control and upper limit control are thereby cancelled, the air flow rate increases more than during idling power generation as shown in FIG. 10, and the lowest cell voltage immediately recovers.

In addition, at this time, the amount of increase in the air flow rate (amount of increase A in FIG. 10) is set depending on the time period since time $t_{21}$ at which idling stop control was initiated until time $t_{22}$ at which the lowest cell voltage falls below the lowest cell voltage threshold (cell voltage decline time T in FIG. 10). More specifically, as the cell voltage decline time T shortens, it is determined that the occurrence of the flooding phenomenon is more considerable and the decline in cell voltage abnormal: therefore, the amount of increase A is set to be larger in order to more reliably resolve the flooding phenomenon and make the cell voltage recover.

The following such effects are exerted according to the present embodiment.

(1) According to the present embodiment, in the fuel cell system 1A executing idling stop control to supply oxidant gas of a lower flow rate than during idling power generation to the fuel cell 10 during idling stop, while producing lower current than during idling power generation from the fuel cell 10, the operation of the air pump 21 is limited during idling stop in a case of the fuel cell system 1A being in a low-pressure environment. More specifically, upper limit control is executed to set the upper limit for the revolution speed of the air pump 21 to allow the air pump 21 to operate at no more than this upper limit. Even in a case of the fuel cell system 1A being in a low-pressure environment such as high ground during execution of the above-mentioned idling stop control, it is possible to limit the operation of the air pump 21, and thus deterioration of the NV performance can be suppressed. In addition, deterioration of the NV performance can be suppressed by way of simple control, since simply controlling the revolution speed of the air pump 21 is sufficient.

(2) In addition, according to the present embodiment, in a case of the lowest cell voltage of the fuel cell 10 falling below a predetermined lowest cell voltage threshold during the upper limit control, it is determined that the flooding phenomenon has occurred, and the flow rate of air supplying the fuel cell 10 is increased. Since the flooding phenomenon is thereby resolved, it is possible to suppress degradation of the electrolyte membrane as well as being able to recover the cell voltage, and thus stable cell voltage can be ensured immediately after returning from idling stop.

(3) In addition, during upper limit control, in a case of the lowest cell voltage falling below the predetermined lowest cell voltage threshold within a predetermined time after initiating idling stop control (cell voltage abnormal decline determination time), this abnormal decline in cell voltage is considered to be caused by the flooding phenomenon occurring excessively and a large amount of water blocking the insides of the air supply line 23 and cathode channel 14. As a result, in the case of the flow rate of air supplying the fuel cell 10 being low, it may not be possible to adequately resolve the flooding phenomenon.

Therefore, according to the present embodiment, in a case of the cell voltage decline time being within a predetermined time, the flow rate of air is increased to more than during idling power generation. Since the flooding phenomenon is thereby reliably resolved, it is possible to suppress degradation of the electrolyte membrane as well as being able to recover the cell voltage, and a stable cell voltage can be ensured immediately after returning from idling stop.

(4) In addition, according to the present embodiment, in a case of the lowest cell voltage suddenly declining during upper limit control, the flow rate of air increases as the cell voltage decline time shortens. In other words, the air flow rate supplying the fuel cell 10 increases depending on the extent of occurrence of the flooding phenomenon. Since the flooding phenomenon is thereby more reliably resolved, it is possible to suppress degradation of the electrolyte membrane as well as being able to recover the cell voltage, and thus a stable cell voltage can be ensured immediately after returning from idling stop.

It should be noted that the present invention is not to be limited to the above-mentioned embodiment, and that modifications, improvements, etc. within a scope that can achieve the object of the present invention are included in the present invention.

For example, although air and hydrogen of low flow rates are supplied during the idling stop control in the above-mentioned embodiment, it may be a configuration that supplies only air of a low flow rate without supplying hydrogen.

What is claimed is:

1. A method for controlling a fuel cell system including a fuel cell stack having stacked together a plurality of fuel cells that generate power by being supplied reactant gas, and
   a reactant gas supply means for supplying reactant gas to the fuel cell stack, the method comprising:
   an idling stop step, initiated in a case of a predetermined condition being established during idling power generation, for supplying oxidant gas of a lower flow rate than during the idling power generation to the fuel cell stack by way of the reactant gas supply means, while producing a lower current than during the idling power generation from the fuel cell stack,
   wherein the oxidant gas is supplied in a steady state during idling power generation, and the oxidant gas is supplied at a lower steady state during idling stop than during idling power generation.

2. The method for controlling a fuel cell system according to claim 1, further comprising:
   a cell voltage threshold determination step of determining whether a lowest cell voltage of the fuel cell stack falls below a predetermined lowest cell voltage threshold during the idling stop step; and
   a cell voltage recovery step of recovering the cell voltage of the fuel cell stack by increasing a flow rate of oxidant gas supplying the fuel cell stack by way of the reactant gas supply means, in a case of having determined that the lowest cell voltage falls below the lowest cell voltage threshold.

3. A method for controlling a fuel cell system including a fuel cell stack having stacked together a plurality of fuel cells that generate power by being supplied reactant gas, and a reactant gas supply means for supplying reactant gas to the fuel cell stack, the method comprising:
   an idling stop step, initiated in a case of a predetermined condition being established during idling power generation, for supplying oxidant gas of a lower flow rate than during the idling power generation to the fuel cell stack by way of the reactant gas supply means, while producing a lower current than during the idling power generation from the fuel cell stack;
   a cell voltage threshold determination step of determining whether a lowest cell voltage of the fuel cell stack falls below a predetermined lowest cell voltage threshold during the idling stop step;
   a cell voltage recovery step of recovering the cell voltage of the fuel cell stack by increasing a flow rate of oxidant gas supplying the fuel cell stack by way of the reactant gas supply means, in a case of having determined that the lowest cell voltage falls below the lowest cell voltage threshold; and
   a cell voltage decline time determination step of determining whether a cell voltage decline time, which is a time from initiating the idling stop step until the lowest cell voltage of the fuel cell stack falls below the lowest cell voltage threshold, is within a predetermined time,
   wherein, in the cell voltage recovery step, the cell voltage of the fuel cell stack is made to recover by increasing the flow rate of oxidant gas supplying the fuel cell stack by way of the reactant gas supply means to more than during the idling power generation, in a case of having determined that the cell voltage decline time is within the predetermined time.

4. The method for controlling a fuel cell system according to claim 3, wherein, in the cell voltage recovery step, the cell voltage is made to recover by increasing the flow rate of oxidant gas supplying the fuel cell stack by way of the reactant gas supply means more, as the cell voltage decline time shortens.

5. The method for controlling a fuel cell system according to claim 1, further comprising:
   a low-pressure environment determination step for determining whether the fuel cell system is in a low-pressure environment during the idling stop step; and
   an operation limiting step for limiting operation of the oxidant gas supply means included in the reactant gas supply means in a case of having determined that the fuel cell system is in a low-pressure environment.

6. The method for controlling a fuel cell system according to claim 5, further comprising:
   a cell voltage threshold determination step of determining whether a lowest cell voltage of the fuel cell stack falls below a predetermined lowest cell voltage threshold during the operation limiting step; and
   a cell voltage recovery step of recovering the cell voltage of the fuel cell stack by increasing a flow rate of oxidant gas supplying the fuel cell stack by way of the oxidant gas supply means, in a case of having determined that the lowest cell voltage falls below the lowest cell voltage threshold.

7. The method for controlling a fuel cell system according to claim 6, further comprising:
   a cell voltage decline time determination step of determining whether a cell voltage decline time, which is a time from initiating the operation limiting step until the lowest cell voltage of the fuel cell stack falls below the lowest cell voltage threshold, is within a predetermined time,
   wherein, in the cell voltage recovery step, the cell voltage of the fuel cell stack is made to recover by increasing the flow rate of oxidant gas supplying the fuel cell stack by way of the oxidant gas supply means to more than during the idling power generation, in a case of having determined that the cell voltage decline time is within the predetermined time.

8. The method for controlling a fuel cell system according to claim 7, wherein, in the cell voltage recovery step, the cell voltage is made to recover by increasing the flow rate of oxidant gas supplying the fuel cell stack by way of the oxidant gas supply means more, as the cell voltage decline time shortens.

* * * * *